March 31, 1970 A. R. MAXEY 3,504,136

DRUM TYPE VIDEO TAPE RECORDER WITH A TAPE WRAP OF MORE THAN 360°

Filed Feb. 27, 1967 15 Sheets-Sheet 1

INVENTOR.
ALEXANDER R. MAXEY
BY
FOWLER, KNOBBE
& GAMBRELL
ATTORNEYS.

INVENTOR.
ALEXANDER R. MAXEY
BY
FOWLER, KNOBBE
& GAMBRELL
ATTORNEYS.

March 31, 1970 A. R. MAXEY 3,504,136

DRUM TYPE VIDEO TAPE RECORDER WITH A TAPE WRAP OF MORE THAN 360°

Filed Feb. 27, 1967 15 Sheets-Sheet 3

INVENTOR.
ALEXANDER R. MAXEY

BY
FOWLER, KNOBBE
& GAMBRELL
ATTORNEYS.

INVENTOR.
ALEXANDER R. MAXEY
BY
FOWLER, KNOBBE
& GAMBRELL
ATTORNEYS.

INVENTOR.
ALEXANDER R. MAXEY
BY
FOWLER, KNOBBE
& GAMBRELL
ATTORNEYS.

DRUM TYPE VIDEO TAPE RECORDER WITH A TAPE WRAP OF MORE THAN 360°

Filed Feb. 27, 1967 15 Sheets-Sheet 6

INVENTOR.
ALEXANDER R. MAXEY

BY
FOWLER, KNOBBE
& GAMBRELL
ATTORNEYS.

INVENTOR.
ALEXANDER R. MAXEY
BY
FOWLER, KNOBBE
& GAMBRELL
ATTORNEYS.

INVENTOR.
ALEXANDER R. MAXEY
BY
FOWLER, KNOBBE & GAMBRELL
ATTORNEYS.

March 31, 1970 A. R. MAXEY 3,504,136

DRUM TYPE VIDEO TAPE RECORDER WITH A TAPE WRAP OF MORE THAN 360°

Filed Feb. 27, 1967 15 Sheets-Sheet 9

INVENTOR.
ALEXANDER R. MAXEY
BY
FOWLER, KNOBBE & GAMBRELL
ATTORNEYS.

INVENTOR.
ALEXANDER R. MAXEY
BY
FOWLER, KNOBBE & MARTENS
ATTORNEYS.

INVENTOR.
ALEXANDER R. MAXEY
BY
FOWLER, KNOBBE
& MARTENS
ATTORNEYS.

INVENTOR.
ALEXANDER R. MAXEY
BY
FOWLER, KNOBBE
& MARTENS
ATTORNEYS.

INVENTOR.
ALEXANDER R. MAXEY
BY
FOWLER, KNOBBE
& MARTENS
ATTORNEYS.

INVENTOR.
ALEXANDER R. MAXEY
BY
FOWLER, KNOBBE
& MARTENS
ATTORNEYS.

INVENTOR.
ALEXANDER R. MAXEY
BY
FOWLER, KNOBBE & MARTENS
ATTORNEYS.

United States Patent Office 3,504,136

Patented Mar. 31, 1970

3,504,136

DRUM TYPE VIDEO TAPE RECORDER WITH A TAPE WRAP OF MORE THAN 360°

Alexander R. Maxey, Newark, Calif., assignor, by mesne assignments, to Allan R. Fowler, Orange, Calif., trustee Continuation-in-part of application Ser. No. 606,510, Dec. 29, 1966. This application Feb. 27, 1967, Ser. No. 625,915

Int. Cl. G11b *5/52, 15/64;* H04n *5/78*

U.S. Cl. 179—100.2 28 Claims

ABSTRACT OF THE DISCLOSURE

Disclosed is a three member tape supporting drum including a rotatable center member flush with adjacent upper and lower stationary members. The spacing between these members is sufficiently close to form a high resistance restriction to air flow between them. During high speed rotation of the center drum this restriction helps maintain air lubrication beneath a magnetic tape spiral wrapped on the drum across the center member. Included are systems for wrapping and unwrapping the tape on the drum in excess of 360° across the center member with adjacent tape edges overlapped.

CROSS REFERENCES

This application is a continuation-in-part of U.S. patent application Ser. No. 606,510, filed Dec. 29, 1966 entitled "Drum Type Video Tape Recorder," which is in turn a continuation-in-part of U.S. patent application Ser. No. 536,107, filed Mar. 21, 1966 entitled "Tape Recorder," both applications now abandoned.

BACKGROUND OF THE INVENTION

This invention relates to apparatus for recording and/or reproducing signals on a tape, and more particularly relates to video tape recorders of the drum type for recording television signals along successive paths which extend diagonally with respect to a magnetic tape wound on the drum along a path oblique to the drum axis.

As a result of the large bulk, complexity and operation and maintenance problems associated with conventional transverse scan video tape recorders, considerable effort has been devoted in recent times to the development of drum type recorders wherein the tape is wrapped around the drum surface along a path oblique to the drum axis and the tape is scanned by a record-reproduce head rotated about the axis of the drum within the tape winding, either by rotating the drum itself or by providing a slot around the periphery of the drum and rotating the record-reproduce head in the slot. In some drum type machines an effort has been made to wrap the tape beyond 360° and abut the adjacent edges of the tape convolutions so that a single record-reproduce head may describe a 360° trace along successive oblique tracks as it is rotated and the tape is moved along the drum surface. In other drum type recorders, the tape is wrapped less than 360° about a drum and two record-reproduce heads are rotated about the drum axis with means for switching between them electrically to provide a continuous signal. Some success has been achieved with these drum type recorders for use in closed circuit television systems and for home use.

One of the major difficulties of passing tape around a drum is that of friction between the tape and the drum surface. With high friction, possible stretching of the tape is a serious problem in view of its adverse effects on fidelity of the signals on the tape. Also, since friction in this situation varies with humidity and other conditions, it is necessary that the equipment function reliably in a variety of environments.

SUMMARY OF THE INVENTION

In accordance with the present invention a drum is provided having a composite regular surface extending about its axis for supporting the tape, and includes upper, central and lower drum members each providing a substantial portion of the composite surface for supporting the tape. The central drum member is rapidly rotatable about the drum axis, and a transducer is mounted adjacent the periphery of the central drum member for recording and/or reproducing signals on the tape. Means are included for guiding tape onto the drum, around the composite surface of the drum in a spiral path across the periphery of the central drum member to intersect the circular path described by the transducer. The peripheral surface of the center drum member is substantially flush with the adjacent surfaces of the upper and lower drum members, and the spacing between the peripheral edges of the central and adjacent drum members is sufficiently close to form a high impedance or resistance to the passage of air between them.

Due to the substantial peripheral surface of the central drum member, its high speed rotation causes considerable entrainment of air between the tape and the drum. Since the spacing between the central drum member and the adjacent fixed members is very slight, a layer of this entrained air tends to remain beneath the tape to lubricate the mating surfaces and reduce friction.

The degree of air lubrication is further enhanced by forming an air passage for communciating air to the interior of the drum, and forming a restricted opening in the periphery of the central drum member. The high speed rotation of the central drum member produces an airflow outwardly through the opening to the underside of the tape spiral.

This drum structure is very advantageous in arrangements wherein the tape is wrapped more than 360° and one transducer head is used. A significant improvement in the air bearing provided between the tape and the drum is attained by extending the tape spiral substantially in excess of 360° with adjacent edge portions of the tape in the spiral overlapping along an area extending across the central drum member. In effect, this creates a 360° tape collar across the central member to confine air and thus reduce friction. Also, this inherently provides a guard band or clear border area along one edge of the tape for auxiliary information such as control and audio signals, permits a superior 360° angular transducer to tape trace with only a single transducer, and overcomes edge effect problems by providing overlap support to the edges of the tape adjacent the scan line or path of the transducer.

The tape edge overlap creates the problem of removing tape from underlying relationship with other tape on the drum at one end of the spiral.

In one embodiment of the present invention, the composite surface of the drum is substantially frustoconical. The drum member defining the larger end of said frustoconical surface has a recessed area thereon, and the adjacent edges of the tape in the spiral cross one another in said recessed area of the drum member to define one extremity of the tape overlap area.

In another embodiment of the present invention, the drum has a composite cylindrical surface. The upper drum member is substantially hollow and has an opening disposed directly in the path of the tape at the upper end of the spiral for passing tape between its peripheral cylindrical surface and its interior. In this embodiment of the invention, the tape guiding means includes means for guiding tape between the interior of the upper drum member and the peripheral surface of the upper drum member in edge underlying relationship with tape on the drum, and means for twisting tape about its center line and guiding the tape between the interior of the upper drum member and a position exterior of the drum.

The present invention and attendant advantages are explained in greater detail in the following description of the preferred embodiments of the invention illustrated in the accompanying drawings, in which.

Figure 1:
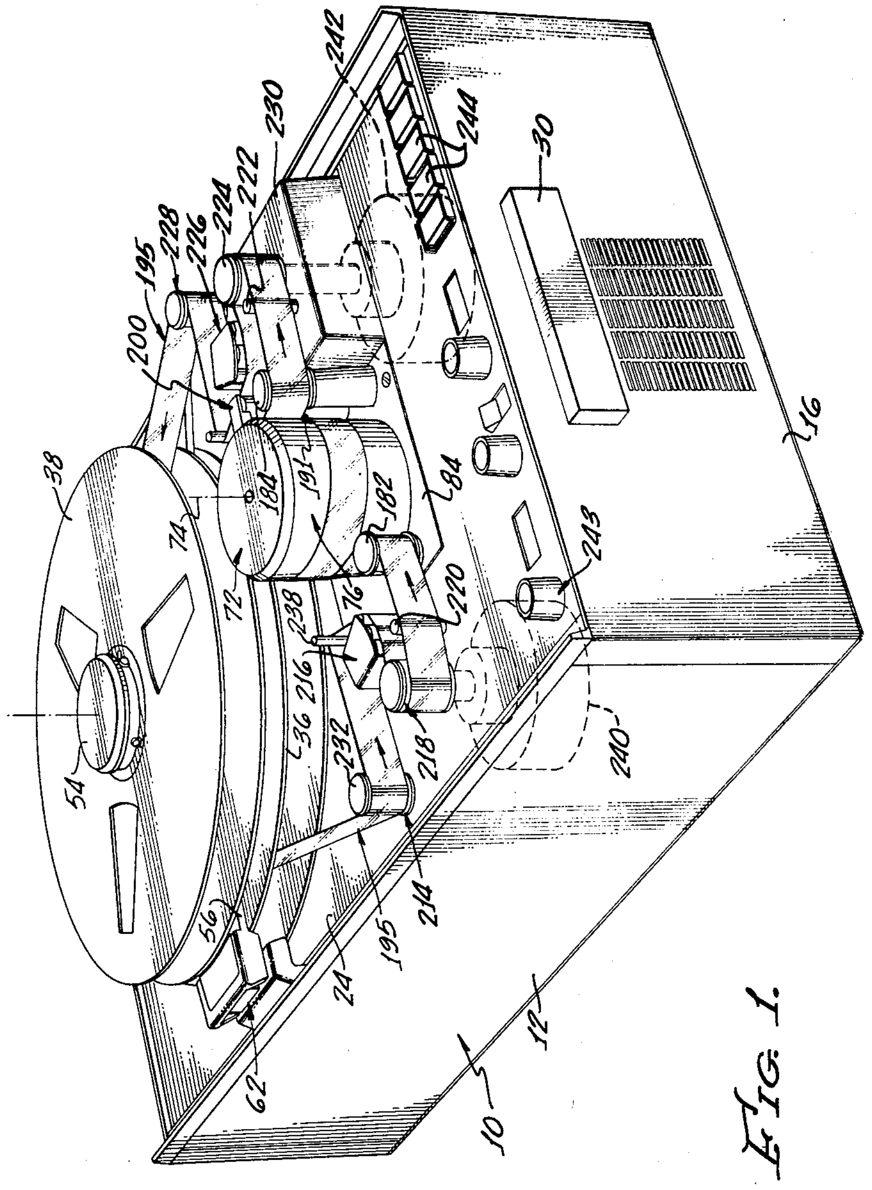
FIG. 1 is a perspective view of a video tape recorder constructed in accordance with one embodiment of the invention utilizing a frustoconical drum.
Figures 2, 4, 5:
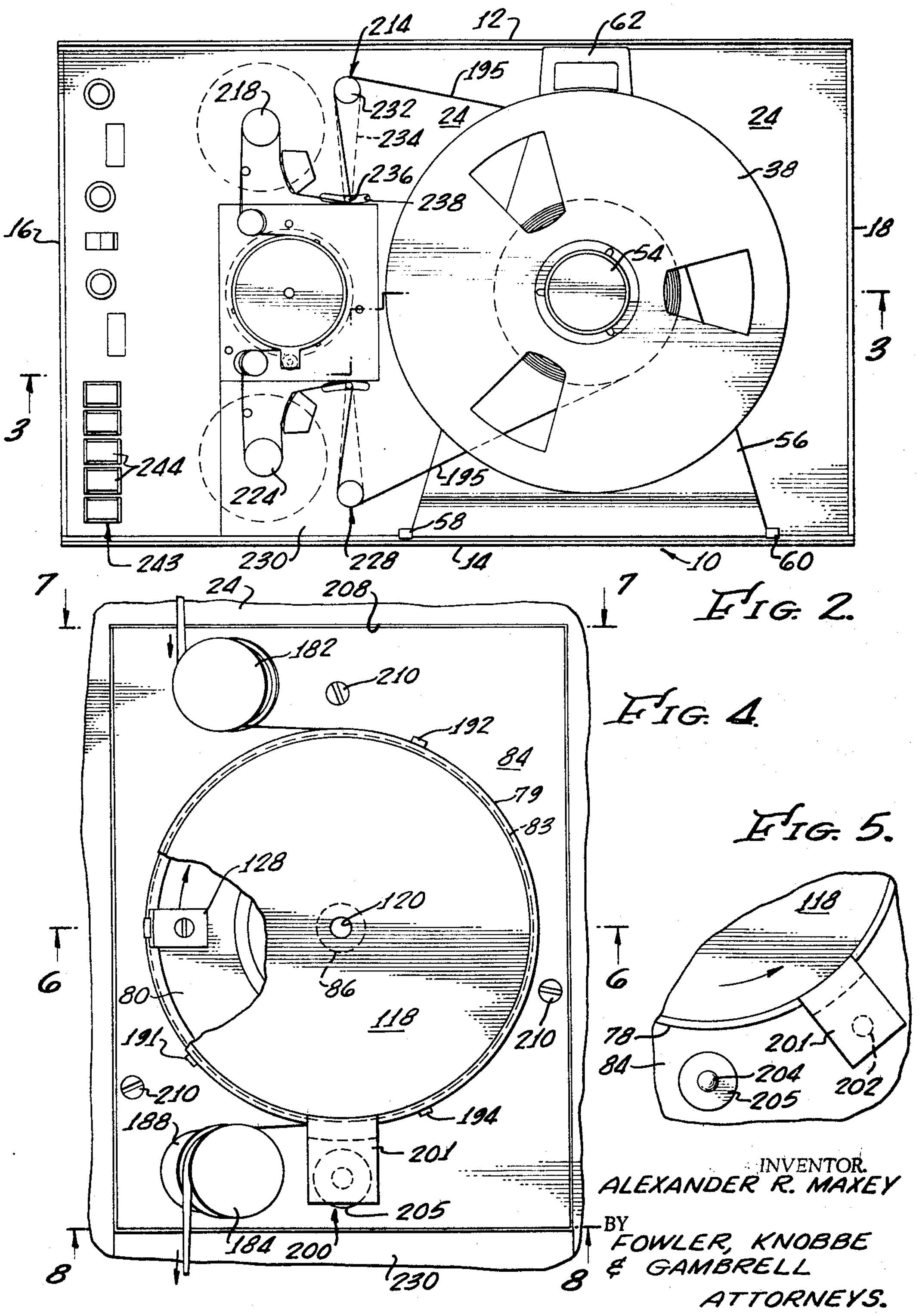
FIG. 2 is a plan view of the recorder of FIG. 1.
FIG. 4 is an enlarged plan view of the drum of the recorder.
FIG. 5 is a fragementary view illustrating a releasable latch for maintaining the rotary position of the upper drum member and for permitting convenient threading of tape onto the drum.
Figure 3:
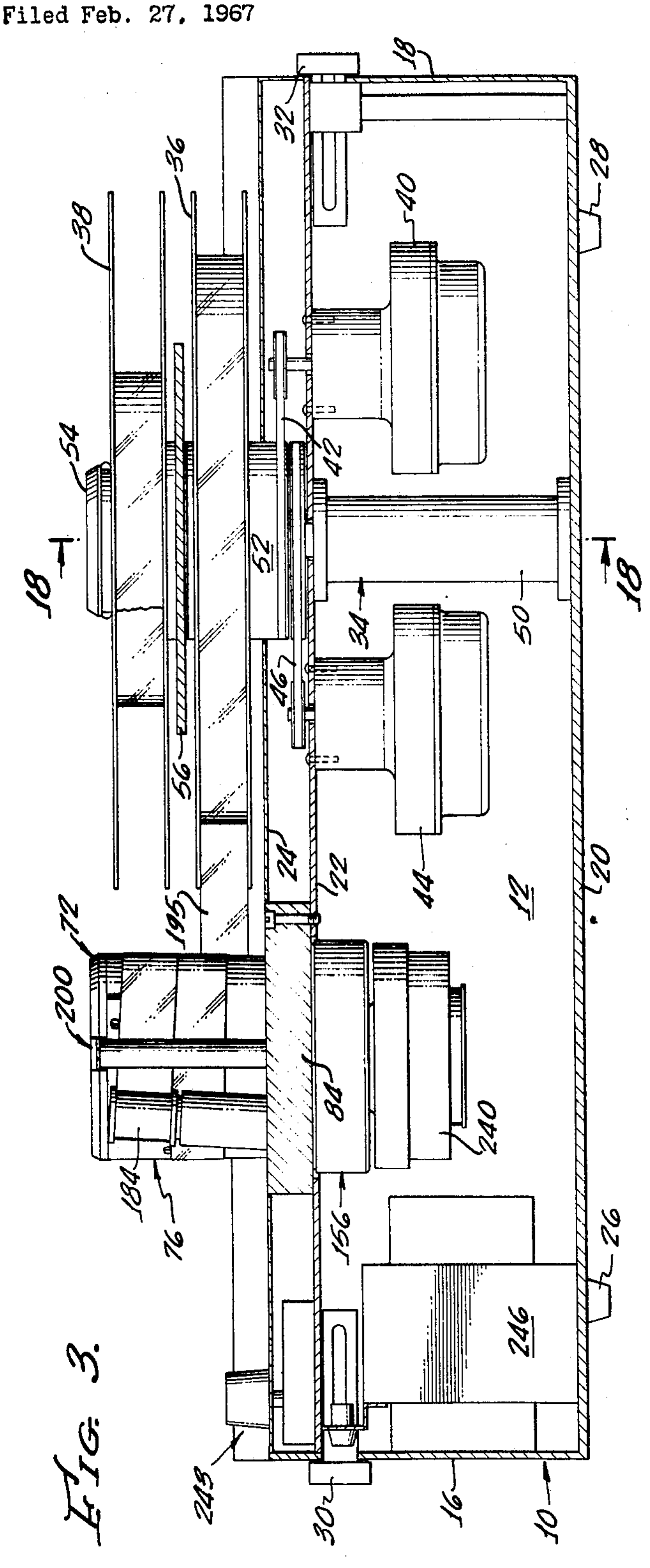
FIG. 3 is a sectional elevation of the recorder taken generally along lines 3—3 of FIG. 2.

Referring now to FIGS. 1 to 3, a video tape recorder in accordance with the present invention includes a body and frame 10 generally in the form of a rectangular parallelepiped having opposite sidewalls 12, 14, opposite front and rear end walls 16, 18, a bottom wall 20, an upper mounting plate 22, and an upper deck 24 spaced above the mounting plate 22. A plurality of legs 26, 28 are fixed to the bottom wall 20 so that the video tape recorder may be conveniently set on a surface, and a pair of retractable carrying handles 30, 32 are mounted at the opposite end walls 16, 18.

A coaxial reel mounting and driving assembly 34 supports a tape supply reel 36 and a tape take-up reel 38 incoaxial relationship, with the supply reel 36 disposed below the take-up reel 38. The supply reel is driven by a motor 40 through a belt linkage 42; and, the take-up reel is driven by a motor 44 through a belt linkage 46.

Figure 18:
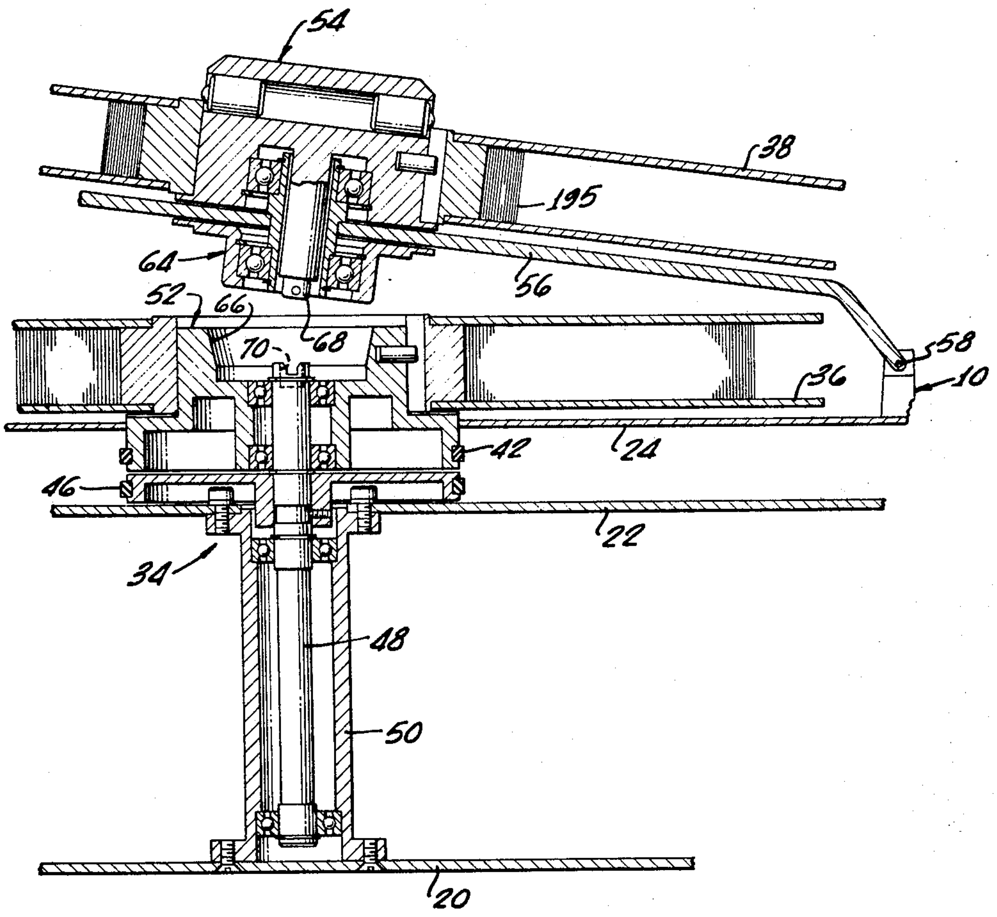
FIG. 18 is a fragmentary sectional elevation taken generally along lines 18—18 of FIG. 3 and illustrating the coaxial mounting and drive means for the tape supply and take-up reels.

While the details of the coaxial mounting and driving assembly 34 form no part of the present invention such that any conventional mechanism may be used, I prefer to use that described in detail and claimed in my copending U.S. patent application Ser. No. 535,983, entitled "Coaxial Tape Transport Apparatus," filed on Mar. 21, 1966, now Pat. No. 3,363,852, and which is illustrated in part in FIG. 18 hereof. As best seen in FIG. 18, this coaxial drive mechanism 34 includes a drive shaft 48 rotatably mounted in a sleeve 50. A supply reel mounting hub 52 is rotatably mounted on the upper end of the drive shaft 48. A take-up reel mounting hub 54 is rotatably journalled on top of a pivotal plate 56, the plate 56 having pivot connections 58, 60 to the frame 10 at one end and a conventional releasable latch 62 at the opposite end. A cap 64 is rotatably journalled on the underneath side of the pivotal plate 56 for engaging a corresponding recess 66 in the top of the supply reel mounting hub 52 and for engaging the supply reel 36 itself. The take-up reel mounting hub 54 has a depending plug 68 which is engageable in rotary lock relationship with a corresponding recess 70 in the upper end of the drive shaft 48.

In operation, the pivotal plate 56 may be pivoted upward and out of the way to insert or remove the supply reel 36 on its hub 52; then, the pivotal plate 56 may be pivoted downwardly until the releasable latch 62 catches and the cap and recess 64, 66 and plug and socket 68, 70 are in mated engagement. The supply reel then is driven by its motor 40 through the belt linkage 42; and, the take-up reel 38 is independently driven by its motor 44 through the belt linkage 46 and the drive shaft 48, which is now rotary coupled with the take-up reel mounting hub 54.

Figure 6:
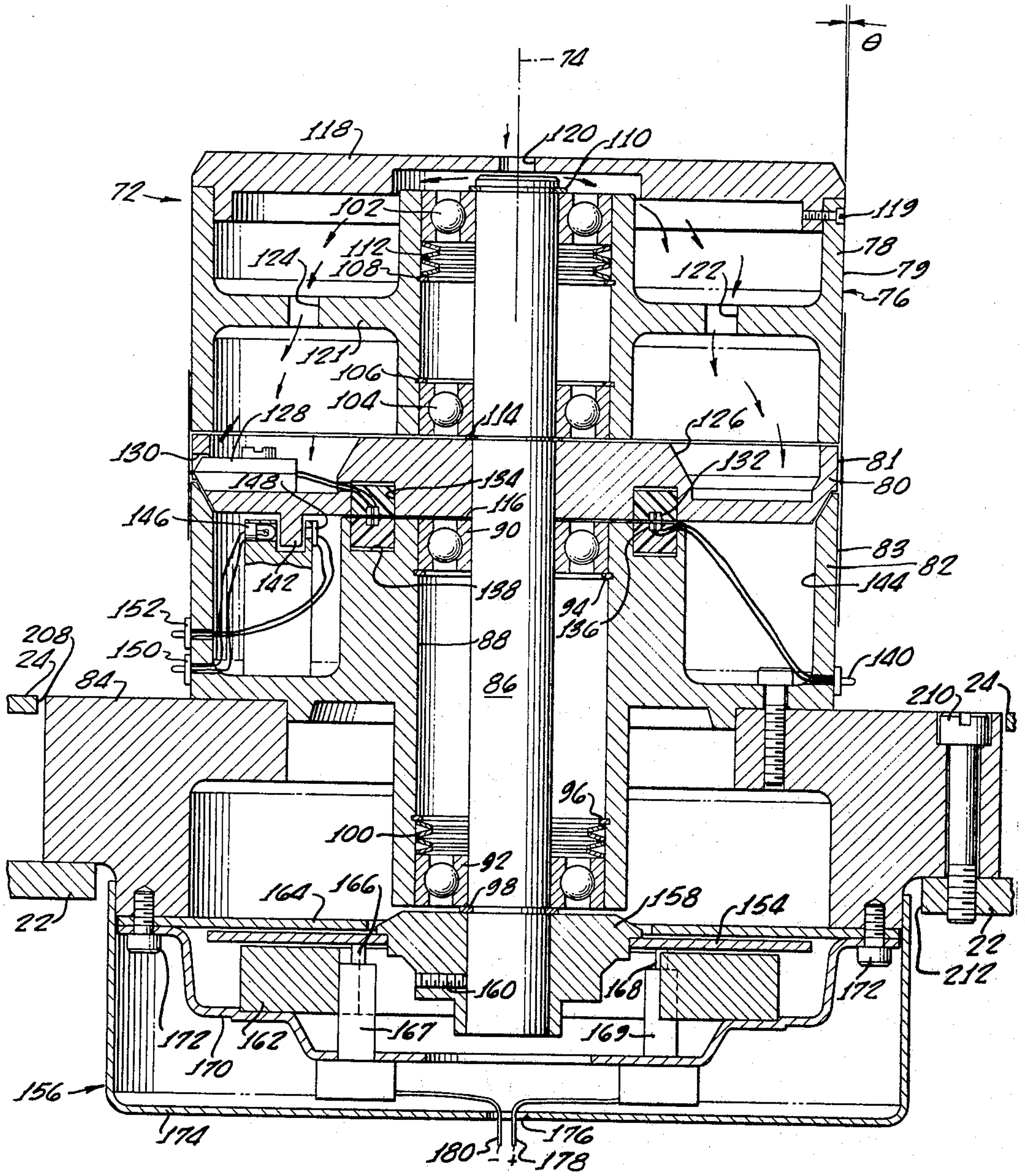
FIG. 6 is a sectional elevation of the drum assembly including sub-frame and motor taken along lines 6—6 of FIG. 4.

A drum 72 extends upwardly from the upper deck 24 of the recorder. The drum has a vertical axis 74, and has a composite and substantially frustoconical surface 76 which extends about the vertical axis 74 and which is of larger diameter adjacent the upper end of the drum and tapers to a smaller diameter adjacent the lower end of the drum. As best seen in FIGS. 4 and 6, the taper of the drum is very slight such that the half angle $\theta$ of the cone is approximately twenty minutes of arc or one-third of one degree of arc.

The drum includes an upper drum member 78, a central drum member 80 and a lower drum member 82 disposed adjacent one another along the drum axis 74 and each having a peripheral surface 79, 81, 83 respectively which provides a substantial tape supporting portion of the composite frustoconical drum surface 76 for supporting the tape.

As best seen in FIG. 6, the drum members are substantially hollow. The lower drum member 82 is fixed to a sub-frame 84 which is in turn fixed to the support plate 22 of the recorder frame 10. A drive shaft 86 is rotatably mounted coaxial with the drum in a central bore 88 of the lower drum member 82 by means of bearings 90, 92, lock washers 94, 96, 98 and Belleville springs 100 for loading the bearings. The central drum member 80 is press-fitted onto the drive shaft 86, hence is rigidly connected therewith. The upper drum member 78 is rotatably mounted on the protruding upper end of the drive shaft 86 by bearings 102, 104, lock washers 106, 108, 110 and Belleville springs 112 for loading the bearings. Shims 114, 116 are used on opposite sides of the central drum member as spacers.

A cap 118 is removably mounted on the top of the upper drum member by a plurality of machine screws 119. The cap has an air opening 120 in it, and the internal web 121 of the upper drum member has air openings 122, 124, thereby providing an air passage which communicates air from the exterior of the drum to the annular recessed interior 126 of the central drum member 80.

A record-reproduce head 128 is mounted adjacent a peripheral opening 130 in the central drum member 80, and is electrically connected to one of the windings 132 of a rotary transformer. This winding 132 is mounted in an annular recess 134 formed in the bottom of the central drum member 80. The other winding 136 of the rotary transformer is mounted in an adjacent annular recess 138 in the top of the lower drum member 82, and is electrically connected to a plug 140 mounted on the exterior of the lower drum member. Conventional electrical circuits (not shown) for recording and/or reproducing video information may be releasably coupled to the plug 140, hence through the rotary transformer windings 136, 132 to the record-reproduce head 128.

A tang 142 depends from the bottom of the central drum member 80 into the hollow interior 144 of the lower drum member 82. A lamp 146 and a photocell 148 are mounted on opposite sides of the circular path traced by the tang 142 when the center drum 80 rotates, thereby to identify the rotary position of the central drum member once each revolution by interruption of the light beam incident on the photocell. Electrical connections are made from the lamp and photocell to external plugs 150, 152 respectively, the plugs being located on the exterior of the lower drum member 82.

The armature 154 of a direct current, printed circuit motor 156 is mounted coaxially on the lower protruding end of the drive shaft 86 by means of a hub 158 and set screw 160. This suspends the armature 154 between the stator field magnet 162 and a magnetic return plate 164, and places it in contact with the motor brushes 166, 168 which are supported in mountings 167, 169. The magnetic return plate 164 is connected to a magnetic support plate 170 which supports the field magnet and the brush mountings, and they are together coupled to the non-magnetic sub-frame 84 by means of screws 172. The motor has a cover 174 which is removably connected to a perimeter of the sub-frame 84 by screws 175. The cover 174 has an opening 176 for admitting electrical wires 178, 180 which extend to the motor brushes.

To disassemble the drum, the top cover 118 is removed and the top lock washer 110 is removed. This permits the entire upper drum member 78 to be removed from the drive shaft 86. The next step is to remove the motor cover 174, and the motor support plate 170, thereby exposing the set screw 160 which can then be loosened to remove the hub 158 and motor armature 154 from the lower end of the drive shaft 86. Following this, the lower lock washer 98 may be removed and the entire drive shaft 86 with the center drum member 80 attached may be lifted out from the lower drum member 82.

As best seen in FIGS. 4, 5, 7, 8 and 10, a tape entrance guide 182 and a tape exit guide 184 assist in guiding the magnetic tape onto the lower end of the drum and in removing the tape away from the upper end of the drum. The tape entrance guide 182 is a conventional rotary tape guide and is bearing mounted for rotation on the top of a relatively short post 186 which is canted at the tape entrance angle $\alpha$ of approximately three degrees upward from the horizontal scan plane 187 of the record-reproduce head. Similarly the tape exit guide 184 is a conventional rotary tape guide, and is bearing mounted for rotation on top of a relatively tall post 188 canted by the tape exit angle $\beta$ of approximately six degrees upward relative to the horizontal scan plane 187. These angles are greatly exaggerated in the drawings for clarity. Both of the posts 186, 188 are mounted on and extend upwardly from the sub-frame 84.

Figures 9, 10:
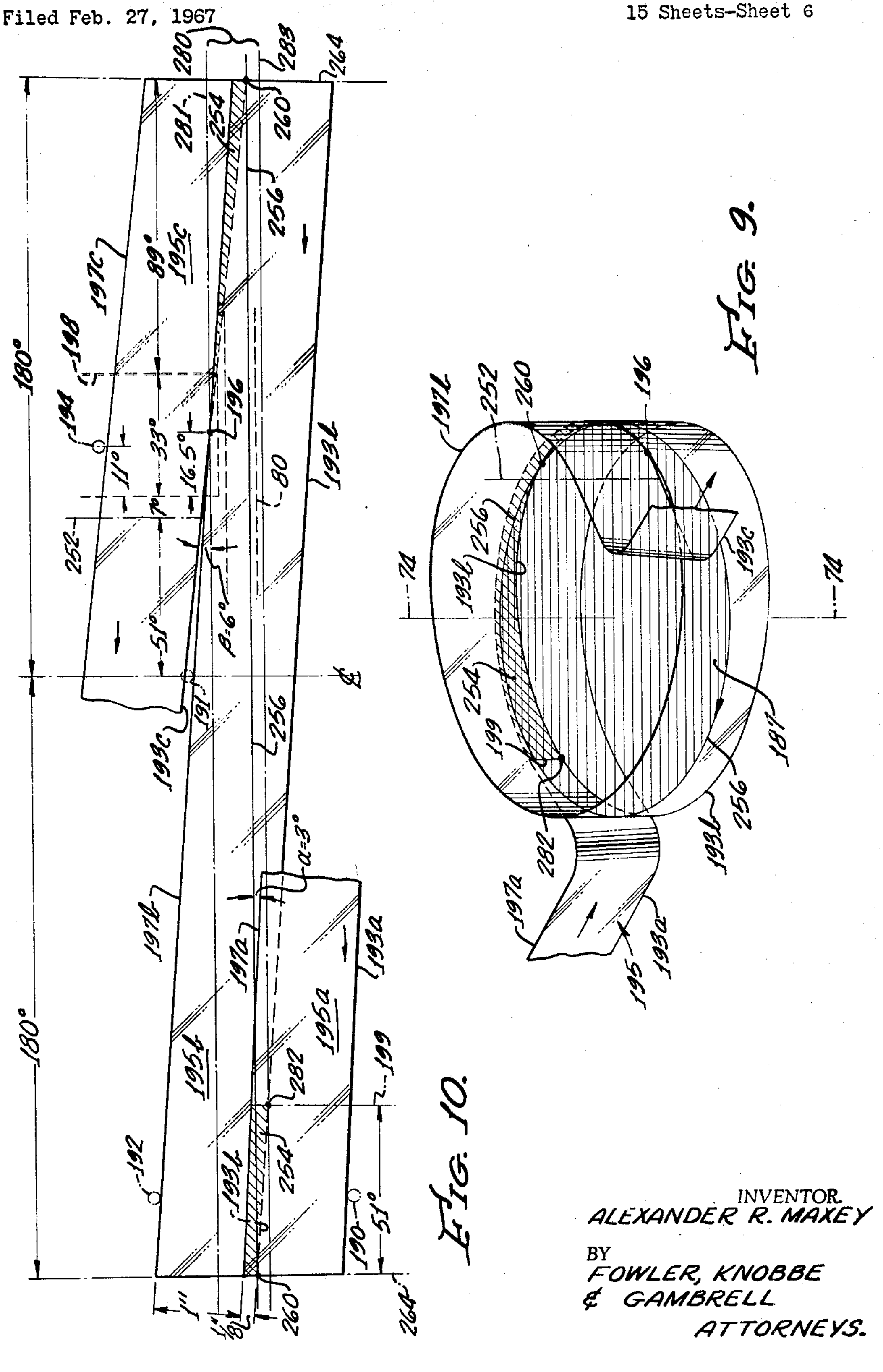
FIG. 9 is a schematic perspective illustrating the spiral of tape around about the frustoconical drum, its overlap areas, and the scan plane of the transducer.
FIG. 10 is an approximate linear development schematically illustrating the tape spiral about the frustoconical drum.

The lower drum member 82 has a tape guide button 190 located thereon for engaging the lower edge 193 of the tape 195, and the upper drum member 78 has three tape guide buttons 191, 192, 194 thereon for engaging and guiding the top edge 197 of the tape. These four guide buttons are spaced about the circumference of the drum approximately as shown in FIG. 10. The first entrance guide button 190 is located just past the tangent line 199 where the tape enters onto the drum. The exit guide button 194 is located just past the point 196 where the lower edge 193*c* of the exiting tape crosses the upper edge 197*b* of the adjacent tape convolution. The upper drum member 78 has a recessed area 198 at this location called the rewind cut.

A releasable latch 200 for the upper drum member 78 includes a tang 201 protruding radially from the cap 118 near the tape exit guide 184, and a spring-loaded ball 204 mounted on top of the post 205 connected to the sub-frame 84. The tang 201 has a detent 202 formed in its underside which is releasably engageable with the spring-loaded ball 204. This structure serves to releasably but precisely fix the angular position of the upper drum member 78, which position is important due to the location thereon of the exit guide button 194 and the recessed area 198 in which the tape edges cross. As best illustrated in FIG. 5, by forceably rotating the upper drum member 78 about the drive shaft 86 so as to disengage the releasable latch formed by the tang 201 and the spring-loaded ball 204, tape may be conveniently threaded about the drum from bottom to top because the top is then free of incumbrance. The forces normally exerted on the upper drum member 78 by the operation of the recorder are insufficient to disengage the latch 200.

Taken together, the sub-frame 84, drum 72, coaxial drum motor 156, entrance and exit guides 182, 184, and releasable latch 200, comprise a drum assembly. The drum assembly is mounted in a rectangular opening 208 formed in the upper deck 24. It is connected to the support plate 22 by a plurality of machine screws 210. The coaxial motor 156 on the under side of the unit extends to the interior of the recorder through an accommodating opening 212 in the support plate 22.

Referring now primarily to FIGS. 1 to 3, the magnetic tape 195 is guided from the supply reel 36 to the lower and smaller end of the drum 72 by a first tape tension device 214, a first magnetic head assembly 216, a rubber-surfaced supply capstan 218, a guide post 220 and the tape entrance guide 182. The tape 195 is guided away from the upper and larger end of the drum 72 to the tape take-up reel 38 by the tape exit guide 184, a guide post 222, a rubber-surfaced take-up capstan 224, a second magnetic head assembly 226, and a second tape tension device 228. A raised portion 230 of the upper deck 24 underlies the operative parts of the mentioned elements for guiding the tape from the top of the drum to the take-up reel.

The first tape tension device 214 includes a rotary tape guide 232, an arm 234 mounted beneath the upper deck 24 for pivotal movement about the axis of the rotary tape guide 232, and a roller 236 connected to the end of the arm 234 and extending upward through an arcuate slot 238 formed in the upper deck 24. The tape 195 is engaged over the rotary guide 232 and around the roller 236 such that movement of the arm 234 about the axis of the rotary guide 232 controls the tension in the tape supplied from the supply reel 36 to the supply capstan 218. The second tape tensioning device 228 is similarly constructed and serves to control the tape tension between the take-up capstan 224 and the tape take-up reel 38. Both tape tensioning devices 214, 228 are coupled to tape tension servo mechanisms (not shown) of which there are many conventional types.

The tape supply capstan 218 is directly driven by a conventional direct current motor 240 mounted on the support plate 22 and disposed coaxially therewith; similarly, the take-up capstan 224 is directly driven by a conventional direct current motor 242 mounted on the support plate 22 and disposed coaxially therewith. The capstan motors 240, 242 and the reel motors 40, 44, may be driven in the forward direction as indicated by the arrows on the tape wherein the tape is moved at a constant slow speed of about ten inches per second with the tape entering at the small and lower end of the drum and exiting at the top and larger end of the drum; and, these motors may be driven in the reverse direction for rewinding the tape from the take-up reel, around the drum, to the supply reel, at a much higher tape speed. Recording and/or reproducing signals on the tape occurs when the tape is driven in the forward direction.

A series of controls 243 including a plurality of switch buttons 244 are mounted on the upper deck 24 adjacent the front end 16 of the frame. The switch buttons 244 serve, among other purposes, the purpose of controlling the direction of the motors which drive the reels and capstans. A power supply 246 is located interior of the recorder frame 10 and, responsive to the setting of the controls 243, activates the electrical circuits (not shown) including servo circuits and amplifiers which drive the various direct current motors included in the recorder. Such circuits are well known in the art.

Figure 7:
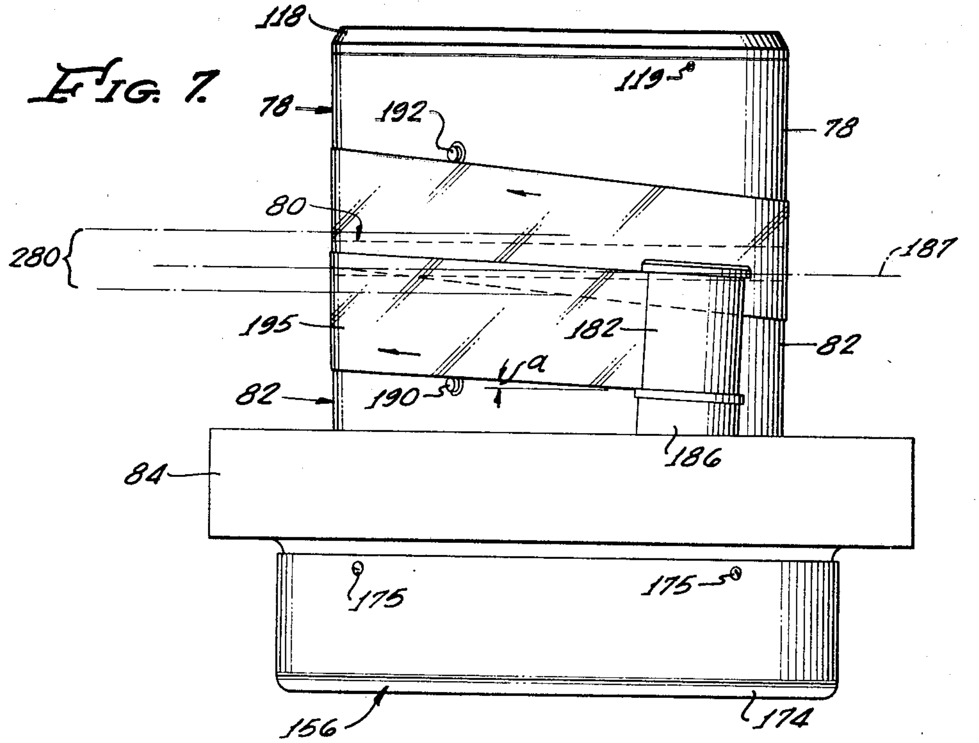
FIG. 7 is an exterior elevation of the frustoconical drum assembly taken from one side thereof, generally along line 7—7 of FIG. 4.
Figure 8:
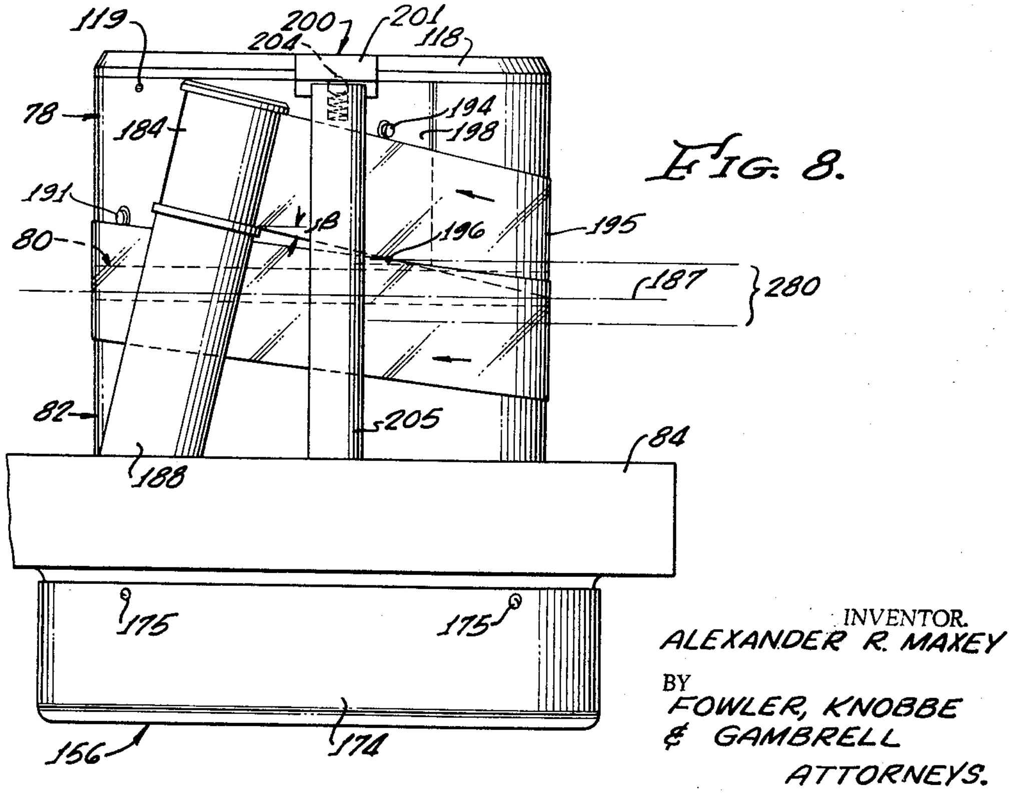
FIG. 8 is an exterior elevation of the frustoconical drum assembly taken from the opposite side thereof, generally along line 8—8 of FIG. 4.

Referring now primarily to FIGS. 9 and 10, although as well to FIGS. 7 and 8, it can be seen that the tape enters onto the lower and smaller end of the frustoconical drum surface approximately on the entrance tangent line 199, and in edge overlapping relationship with tape on the drum. The tape then extends around the frustoconical drum surface in an upward spiral of increasing pitch for one and one-half revolutions or 540°, and leaves the upper and larger end of the drum from underlying relationship with tape on the drum and approximately along an exit tangent line 252. Adjacent edges 197*a*, 193*b* and 197*b*, 193*c*, of the tape in spiral overlap one another, with the entering tape on top, in an area 254 which is approximately in the shape of an elongated triangle having its base at the entrance tangent line 199 and its apex at the tape edge crossover point 196.

The overlap area 254 is shown in FIGS. 9 and 10 in the slanted cross hatch. As can be seen the overlap area 254 intersects the circular path 256 described by the pole pieces 258 of the record-reproduce head 128 as it is rotated about the axis of the drum, and the overlap area extends for a substantial distance in both directions around the drum from the point 260 where the circular path 256 of the record-reproduce head intersects the exposed edge 193*b* of the tape in the overlap area. It will be noted in FIG. 10 that the lines 264 at opposite ends of the figure are coincident with the intersection point 260 of the scan line 256 with the exposed tape edge 193*b*, and constitute the same line on the drum. All lines are only approximate and in reality may be slightly curved.

The general tape overlap and entrance and exit locations have been achieved by utilizing a magnetic tape one inch wide wound about a frustoconical drum surface having a diameter of about 3.82 inches at the scan line 256 and having a cone half angle $\theta$ of about one-third of one degree of arc. With a tape entrance angle $\alpha$ of about three degrees one can conveniently achieve an overlap of about one-eighth inch at the point 260 where the scan line 256 crosses the exposed edge 193*b* of the tape. This point 260 occurs about 51° around the drum from the tape entrance tangent 199. From this point 260 the overlap area 254 continues to extend about the drum for an angular distance of about 105° to the tape edge crossover point 196. The tape edge crossover point 196 resides about midway along the recessed area 198 in the upper drum member. This recessed area is about 33° wide, and the tape exit tangent 252 is spaced on around the drum from it by about 7°.

As indicated on the scan line in FIG. 9, and as indicated elsewhere in the drawings, the center drum member 80 is rotated clockwise about the drum axis 74 when viewed from the large end of the frustoconical drum surface, so that the record-reproduce head which engages the inside of the tape spiral in describing its circle moves off of, rather than on to, the exposed tape edge 193*b* in the area of overlap 254. This provides better continuity of recorded and/or reproduced signal and better tape stability and quality of signal. Furthermore, as will be appreciated better later in the description, rotation in this direction prevents the exposed tape edge from tending to shear the air film off the rotating center drum member and interfering with the air bearing.

Figure 11:
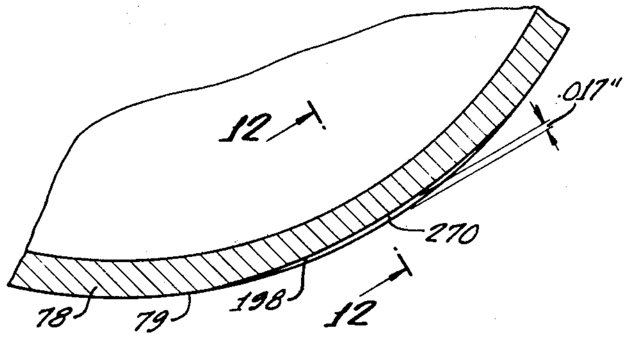
FIG. 11 is a fragmentary sectional view taken in a plane normal to the frustoconical drum axis and illustrating the recessed area in the upper drum member.
Figure 12:
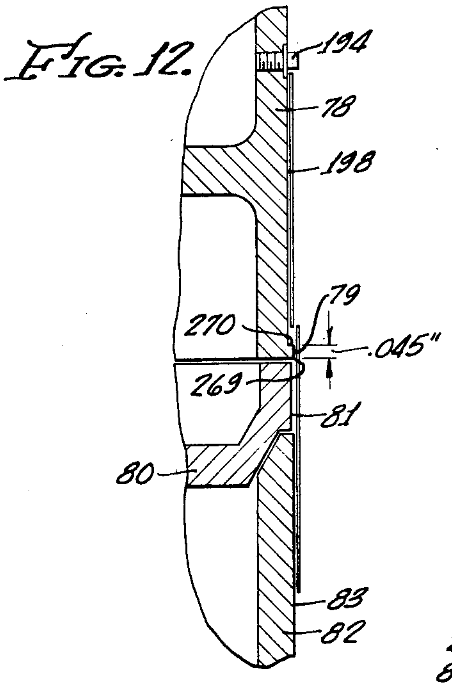
FIG. 12 is a fragmentary sectional view of the frustoconical drum taken along line 12—12 of FIG. 11.
Figure 13:
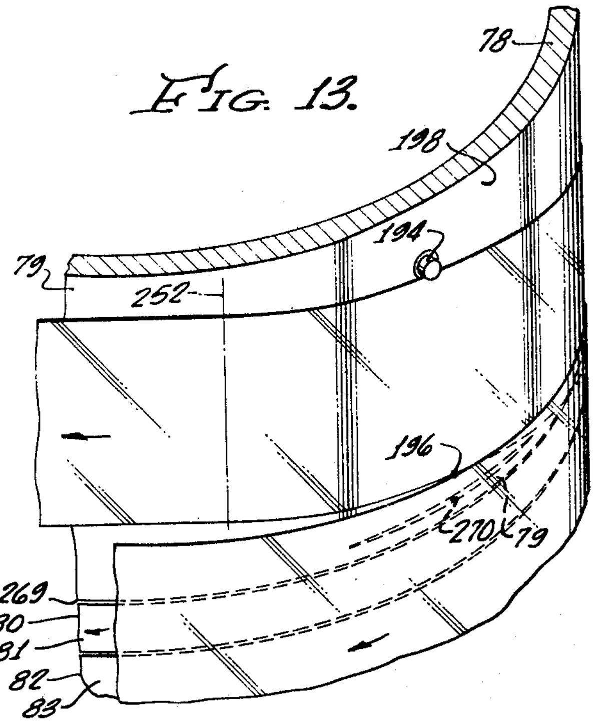
FIG. 13 is a fragmentary perspective view of the frustoconical drum adjacent the recessed area in the upper drum member and illustrating the tape exiting from the drum.

As indicated in FIGS. 11, 12 and 13, the recessed area or rewind cut 198 in the upper drum member 78 is an arcuate cut in the drum member on a longer radius. The maximum depth of the cut in its center is about 0.017 inch. The rewind cut 198 is formed at a location spaced upwardly by a distance of about 0.045 inch from the peripheral edge 269 of the upper drum member 78 which lies adjacent that of the center drum member 80, thus defining a ledge 270 and leaving a narrow portion of the frustoconical peripheral surface 79 of the upper drum member 78 intact.

With the tape driven in the forward direction during the record and/or reproduce operation, it can be appreciated that in extending from the small to the large end of the frustoconical surface in an increasing spiral with the overlapping edge of the entering tape on top, the tape is being removed from the drum in the direction which tends to decouple the overlapped edge portions of the tape; that is, the direction which produces a de-energizing rather than a self-energizing brake effect. This promotes stability of the tape during the record and/or reproduce operation and becomes especially significant under extreme environmental conditions, such as very high humidity or any other condition which increases the frictional forces on the tape in the tape overlap area. On the other hand, when the tape is moved in the reverse or rewind direction about the drum by reversing the capstan and reel motors with the control switches, the entering tape enters the large end of the frustoconical surface and as seen at the tape crossover point 196 extends under the then succeeding tape convolution.

One of the purposes of the rewind cut 198 in the upper drum member 78 is to provide relief which permits the entering tape during rewind to slip easily under the succeeding convolution of tape at the tape edge crossover point 196, having in mind the tape instability and self-energizing brake effect tendencies involved in running the tape in this direction. The tape edge crossover point 196 is located within the recessed area 198 and above the ledge 272 so that ample relief is provided.

In order to promote stability of the tape moving around the drum, the tape exit tangent line 252 is located on the frustoconical drum surface at a spaced position on the distal or tape exit side of the rewind cut 198. The exit guide button 194 is located in the rewind cut area slightly off-center toward the tape exit 252, and serves to guide the tape and especially to facilitate the crossover of the tape edges at the crossover point 196 during rewind.

Figure 14:
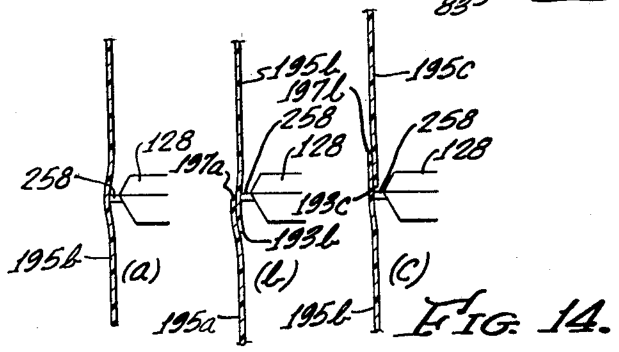
FIG. 14 is a schematic diagram in three parts (*a*), (*b*), and (*c*) illustrating the engagement of the record-reproduce head with the tape at different positions around the drum axis.

Referring to FIGS. 10 and 14, by observing the position of the tape overlap one can see that FIG. 14*a* illustrates the record-reproduce head 128 in engagement with free tape **195*b***, which could be at the centerline position in FIG. 10. In FIG. 14*b* the record-reproduce head has arrived at the tape entrance tangent 199, and thus has gotten as close to the unsupported part of the lower edge **193*b* of the tape as is permitted, because at this point the upper edge 197*a*** of the entering tape overlies it. In FIG. 14*c*, the record-reproduce head 128 in continuing its circular scan has gone just beyond the point 260 in FIG. 10 where it has fallen off of the exposed tape edge **193*b* and onto the unsupported tape 195*b*. However, due to the amount of overlap in this area, the unsupported upper edge 197*b* of the tape 195*b* is spaced away from the scan line 256 of the record-reproduce head. Thus, with a substantial overlap area extending about the drum and intersecting the scan line of the record-reproduce head 128**, the record-reproduce head may be kept away from any unsupported free edges of the tape convolutions.

The instability of a tape when engaged in the normal direction adjacent its free edge is well known. This creates serious problems in the recorded information adjacent the edges of the tape. The described overlap area greatly reduces and/or eliminates these edge effect problems.

Figures 15, 16:
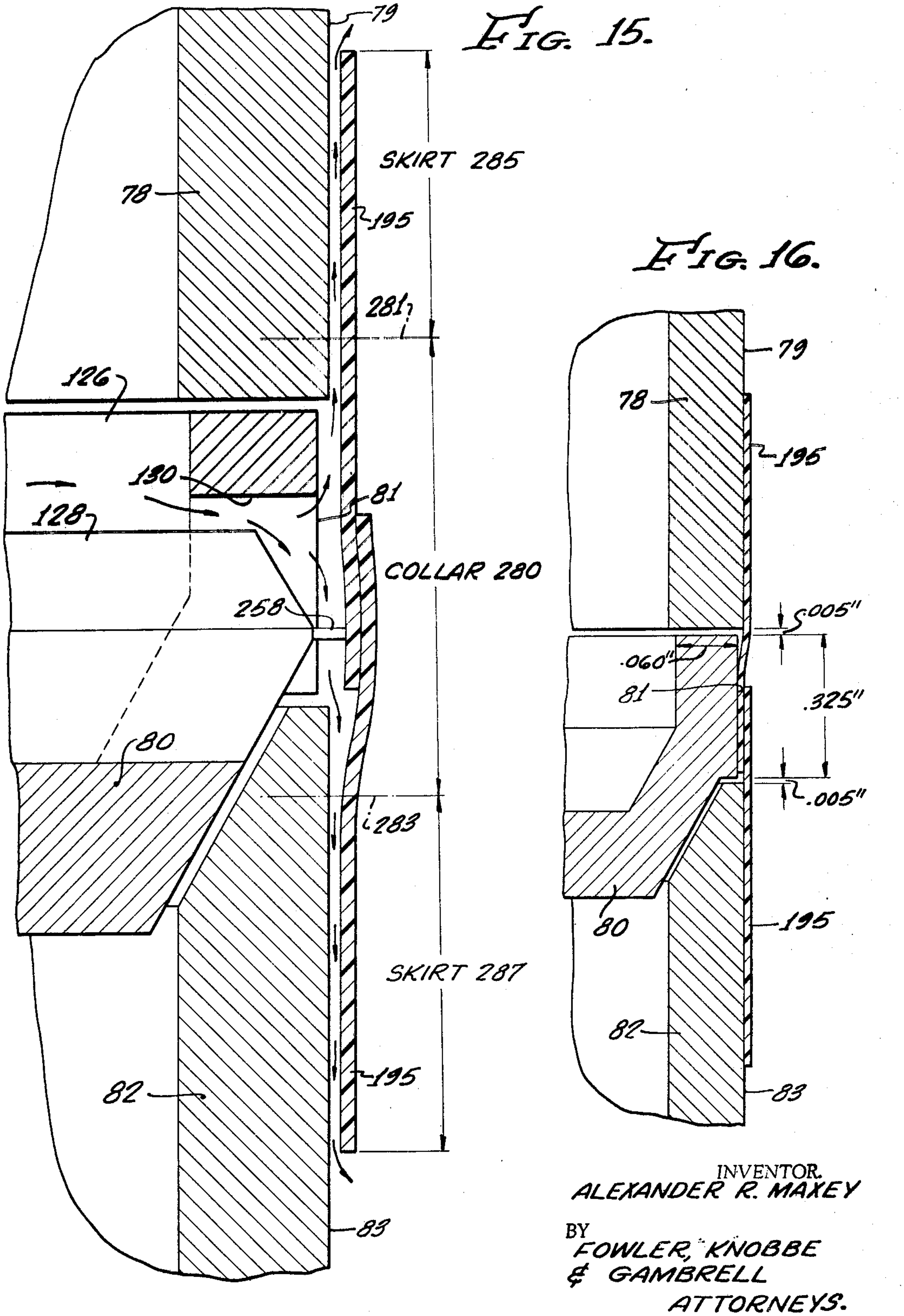
FIG. 15 is a fragmentary sectional elevation taken in a plane containing the drum axis and illustrating the tape engaged across the frustoconical drum surface and the formation of an air bearing between the tape and this surface.
FIG. 16 is a fragmentary sectional elevation similar to FIG. 15, but illustrating the center drum at rest and rotated to a position where the record-reproduce head is not seen.

Referring now primarily to FIGS. 9, 10, 15 and 16, it will be noted that the overlap area 254 extends from a lower point 282 located opposite the exposed edge **193*b* of the tape and on the tape entrance tangent 199, upwardly to the tape edge crossover point. Thus, the overlap area extends from on the surface 83 of lower drum member 82 across the surface 81 of the central drum member 80 and on to the surface 79 of the upper drum member 78, and thus accounts for a closed collar 280 of tape which engages around the lower periphery of the upper drum member and the upper periphery of the lower drum member. The upper and lower circular peripheries of the collar lie in planes 281, 283 disposed above and below and parallel to the plane 187 of the record-reproduce head scan line 256. On the upper drum member 78, the tape collar 280 engages on the frustoconical surface portion extending beneath the recessed area 198. The portions of the tape spiral engaged on the composite frustoconical drum surface above and below the collar are called skirts 285, 287** (FIG. 16).

As best seen in FIG. 15, the central drum member 80 has a height of about 0.325 inch. The peripheral edges of the central drum member are spaced about 0.005 inch from the adjacent peripheral edges of the upper and lower drum members, with the minimum co-extensive wall thickness in these peripheral areas being about 0.060 inch. This spacing is sufficiently close to form a high impedance or restriction to the passage of air between the peripheries of the drum members, which is roughly comparable to, or greater than, the impedance or restriction to the passage of air out from under the tape along the surfaces 79, 83 of the upper and lower drum members.

Referring to FIG. 16, air from the hollow interior 126 of the center drum member 80 passes out the peripheral opening 130 adjacent the transducer 128 in the central drum member, and with the central drum member moving at a high rotational speed of about 3600 revolutions per minute, air moves into the area under the tape collar 280, probably both by the process of centrifugal force and by entrainment of the air molecules on the under side of the tape collar. With the tape collar effectively engaged on the upper and lower drum members respectively, high pressure low volume air creates an air bearing with air moving outwardly under the upper and lower skirts 285, 287.

Figure 31:
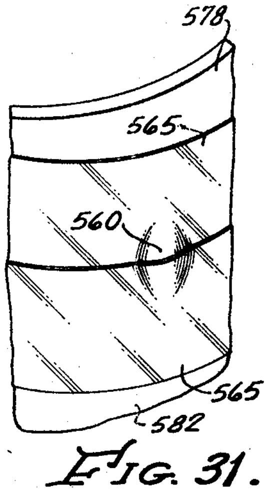
FIG. 31 is a fragmentary perspective view of the miniature tent formed in the tape surface by the transducer.

Also assisting in the movement of air beneath the tape is the fact that the pole pieces 258 of the record-reproduce head extend outwardly beyond the effective periphery of the drum surface a small amount, preferably about .006 inch. As can be seen from the exaggerated views of FIGS. 14 and 15, this causes a slight outwardly extending protuberance or miniature tent in the tape surface. As more clearly seen in FIGS. 29 and 31, a tent 560 formed by pole pieces 558 in turn creates a small space 562 beneath the tape. It has been found that during high speed rotation of the transducer, this rotating tent makes a significant contribution to the movement of air through the opening 130 (FIG. 15) to the area beneath the tape.

Regarding the creation of the air bearing, so far as is known it is highly desirable but not necessarily essential that the tape collar 280 engage over both the upper and lower drum members. It does appear however that the closed collar of tape must extend onto at least the one stationary drum member toward which the rotary direction of advance of the tape spiral and the direction of rotation of the central drum member are the same.

The periphery of the central drum member 80 is recessed with respect to the adjacent peripheries of the upper and lower drum members by a slight amount, about 0.001 inch. This recess is about equivalent to the thickness of a magnetic tape, which usually is about 0.0010 inch to 0.0015 inch. Also, it will be noted that the height of the peripheral surface 81 of the central drum member is about one-third the tape width of one inch. The peripheral surface 81 of the central drum member, like the peripheral surfaces 79, 83 of the upper and lower drum members, is a frustoconical surface. Thus, the composite surface of the drum 72 is substantially frustoconical, with the amount of recess of the periphery of the central drum member being so small as to be nearly invisible to the naked eye.

Recessing the central drum member's peripheral surface relative to the upper and lower drum member surfaces has several useful purposes. For example, it provides some relief for the tape in the overlap area so as to reduce the normal forces between the tape convolutions, hence to reduce tape coupling and increase tape stability. Also, it helps overcome starting problems by slightly reducing the normal forces between the tape and the peripheral surface 81 of the central drum member.

As can be seen best in FIG. 16 where the center drum 80 is shown at rest, when you first begin to rotate this center drum to cause the record-reproduce head 128 to scan the tape, the tape is collapsed onto the drum surface because there is no air bearing. Thus, when the center drum member 80 begins to rotate, it tends to carry the tape with it, particularly under extreme environmental conditions such as high humidity conditions. To overcome starting problems in some video tape recorders, a mechanism is included for releasing and re-engaging the tape so that the scanning drum may be brought up to speed.

In the apparatus illustrated herein, there are several factors which contribute to eliminating starting problems without resorting to mechanisms for releasing and re-engaging the tape. The tape is wrapped one and one-half revolutions about the drum, and with the particular values of tape entrance angle, etc. shown, it will be noted that the area of the peripheral surface 81 of the center drum member is about one-fourth the total of the combined areas of tape engagement with the surfaces 79, 83 of the upper and lower drum members; and, by having both the upper and the lower drum members stationary, the tape winding is well anchored about the drum. Also, relieving the peripheral surface 81 of the center drum member relative to the adjacent peripheral surfaces of the upper and lower drum members assists in eliminating these problems.

Figure 17:
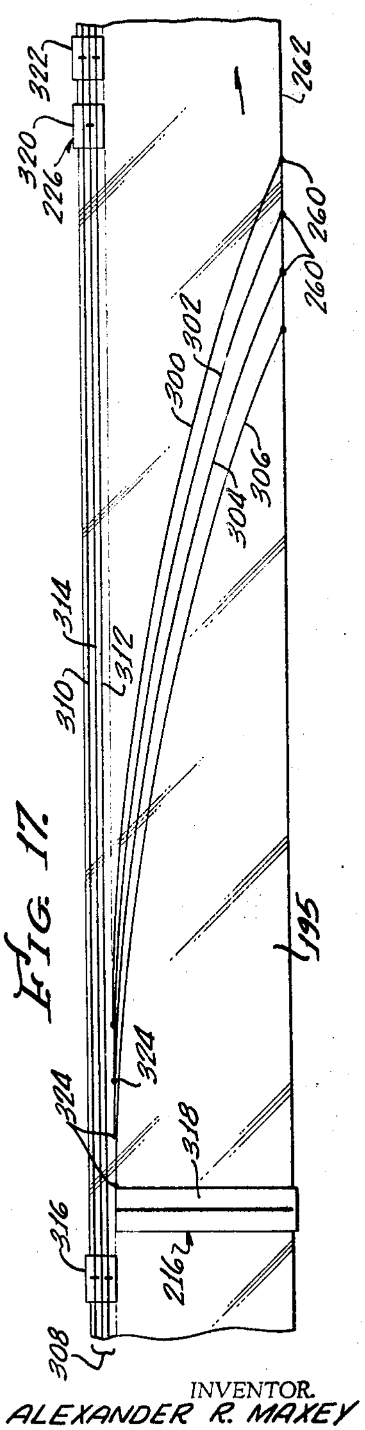
FIG. 17 is a schematic representation of a fragment of tape recorded on the frustoconical drum, and illustrating the longitudinal control and audio tracks and the successive paths extending obliquely of the tape containing the video signal information.

Referring now primarily to FIGS. 1 and 17, it can be seen that by having the small end of the frustoconical surface of the drum 72 at the bottom, the supply reel 36 may be conveniently threaded and the tape may be wound about the drum right-handed from bottom to top over the unobstructed upper end of the drum after opening the latch 200. The take-op reel, now disposed in an accessible position on top of the supply reel, then is threaded.

The drum motor 156, the capstan motors 240, 242, and the reel motors 40, 44 then are energized by operating the controls 243 whereby the tape is moved longitudinally from the supply reel, across the first recording head assembly 216, around the drum in an upwardly extending spiral, back across the second recording head assembly 226, and to the take-up reel. The drum motor runs not only during record-reproduce but also during rewind so as to maintain the air bearing when the tape is moved around the drum.

As can be seen in FIG. 17, during the record-reproduce, successive revolutions of the central drum member will cause the record-reproduce head to scan along successive paths 300, 302, 304, 306, which extend obliquely or diagonally with respect to the tape 195. The overlap of the tape at the point 260 at which the transducer scan line crosses the exposed lower tape edge 193 inherently provides a guard band 308 along one edge of the tape the width of which may be selected by varying the cone angle $\theta$ the entrance angle $\alpha$ and other values. Within the guard band 308 which is about one-eighth inch wide, it is easily possible to record longitudinal audio tracks 310, 312 and a longitudinal control track 314. Accordingly, the first recording head assembly 216 includes a pair of audio erase heads 316 and a video erase head 318; and the second recording head assembly 226 includes a control signal recording head 320 and a pair of audio recording heads 322.

In FIG. 17 it is seen that the successive points 260 at which the record-reproduce head falls off of the exposed or lower tape edge 193 at the end of each trace are related to successive points 324 at which the record-reproduce head falls onto the incoming tape 195. While in the linear showing of FIG. 17 these points are far apart, they are very close together when the tape is wrapped about the drum. Any loss of signal information as the record-reproduce head passes between these points is called the dropout. While the dropout may be arranged to occur in the vertical blanking interval of a television signal, the dropout produces a loss of synchronization signals even in this interval and it is desirable to keep the dropout as brief as possible. The tape overlap provided by the present apparatus greatly reduces the dropout time interval. Also, in inherently providing the guard band 308, it obviates the necessity which occurs in some devices for subsequently erasing part of the synchronization signals in the vertical blanking interval in order to provide a longitudinal area for audio and control signals along the edge of the tape.

EMBODIMENT OF FIGURES 19–28

The numbering of the new components in this embodiment will be different from that previously used, although where convenient the last two digits of the numbers will correspond to similar components of the earlier described embodiment. Those portions of the tape recorder structure which are the same as the first arrangement, will keep their same numbers.

Figure 19:
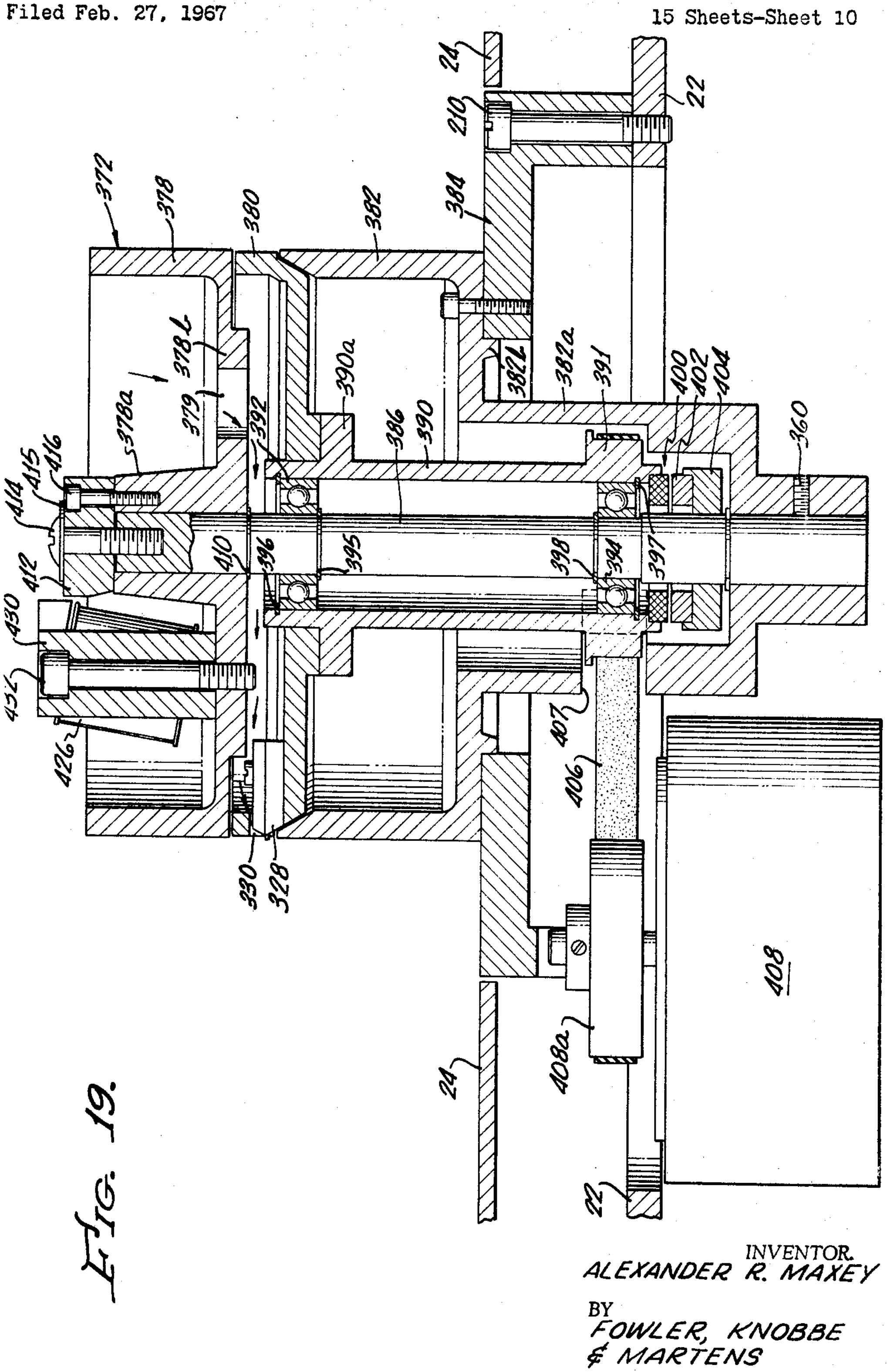
FIG. 19 is a sectional elevation of a cylindrical drum assembly including sub-frame and motor, in accordance with another embodiment of the invention.
Figure 20:
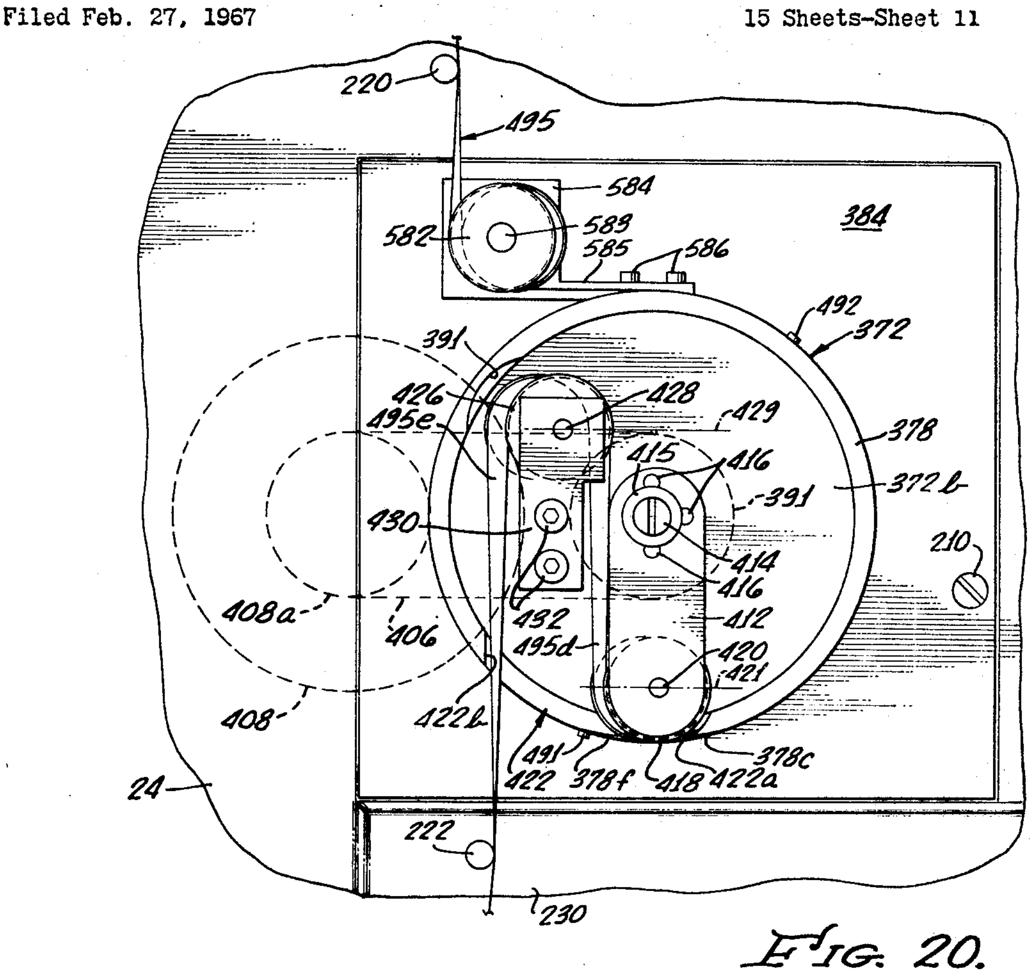
FIG. 20 is a top view of the cylindrical drum assembly of FIG. 19.
Figure 21:
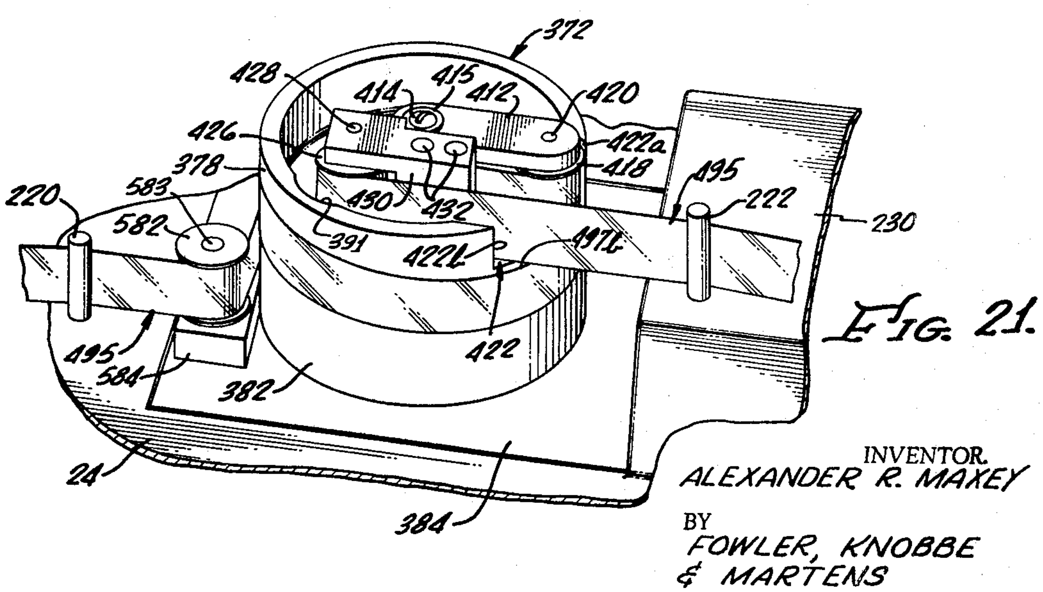
FIG. 21 is a perspective view of the cylindrical drum assembly.

Referring first to FIGS. 19, 20 and 21 there is shown a cylindrical drum 372 extending upwardly from a sub-frame 384 positioned within an opening in the surrounding upper deck 24 and attached to the mounting plate 22 by suitable threaded fasteners 210. The cylindrical drum 372 is formed by an upper drum member 378, a central drum member 380, and a lower drum member 382 each positioned on a common axis extending through a vertically oriented drum shaft 386. The lower drum member 382, which is generally cup-shaped, includes a depending cylindrical portion **382*a* and an annular flange 382*b* extending into the interior of the tape recorder through an opening in the sub-frame 384. The drum shaft 386 is permanently fixed by being press-fit to the lower drum member 382 and further secured by a set screw 360**.

The central drum member 380 is a shallow cup-shaped element carrying a record-reproduce head 328 on its outer periphery. As seen, the record-reproduce head 328 is located in an opening 330 which permits the head to extend slightly beyond the periphery of the central drum member 380 which is recessed from the upper and lower drum members. The central portion of the central drum member 380 is press-fit onto the upper end of an enlarged cylindrical sleeve 390 spaced from and surrounding the shaft 386 and extending downwardly into the lower drum member 382. The central drum member engages a flange **390*a* formed near the upper end of the sleeve 390, and if desired the central drum member may be further attached to the sleeve 390 by suitable fasteners extending through the flange 390*a***.

The sleeve 390 is mounted for rotation on the fixed shaft 386 by means of an upper bearing 392, a lower bearing 394 and retaining elements 395, 396, 397 and 398. At the lower end of the sleeve 390 is attached a rotary transformer element 400 which cooperates with a fixed transformer element 402 carried by a supporting member 404 attached to the shaft 386. The transformer provides electrical coupling for the record-reproduce head 328; however, the necessary electrical leads have not been illustrated.

For rotating the sleeve 390 and thus the central drum member 380, there is provided a pulley surface 391 formed near the lower end of the sleeve 390 for receiving a belt 406. The belt in turn extends through an opening 407 formed in the cylindrical portion **382*a* of the lower drum member 382 and is mounted on an output wheel 408*a* of a motor 408 suitably mounted within the body of the tape recorder. The motor 408** is adapted to drive the central drum member at the desired speed of 3600 revolutions per minute.

The upper drum member 378 is substantially hollow and is formed with a central hub **378*a* extending upwardly from a bottom wall 378*b*. The hub is mounted on the upper end of the drum shaft 386 where it engages a retaining washer 410. A threaded fastener 414 extending through an elongated arm 412 and a washer 415 is threaded into the upper end of the drum shaft 386 to secure the upper drum member to the shaft. The arm 412 is further positioned by a series of fasteners 416. An opening 379 in the bottom wall 378*b* adjacent the hub 378*a* permits air flow into the area of the central drum member 380**.

As can be seen from FIGS. 20 and 21, the arm 412 extends outwardly to the periphery of the upper drum member 378. In accordance with the invention, an exit guide roller 418 having flanges on either end is mounted on a pin or axis 420 extending through the outer end of the arm 412. The roller 418 is partially located within an irregularly shaped opening or slot 422 formed in the peripheral wall of the upper drum member 378.

The roller 418 is oriented in approximately tangential relation with the outer periphery of the upper drum member 378. However, more precisely, the roller is actually recessed slightly from the drum periphery and is oriented at an angle of approximately three degrees with respect to the vertical. The roller is directly in the path of the tape spiral 495 as it leaves the surface of the drum and enters the interior of the upper drum member to engage the roller 418.

Figure 23:
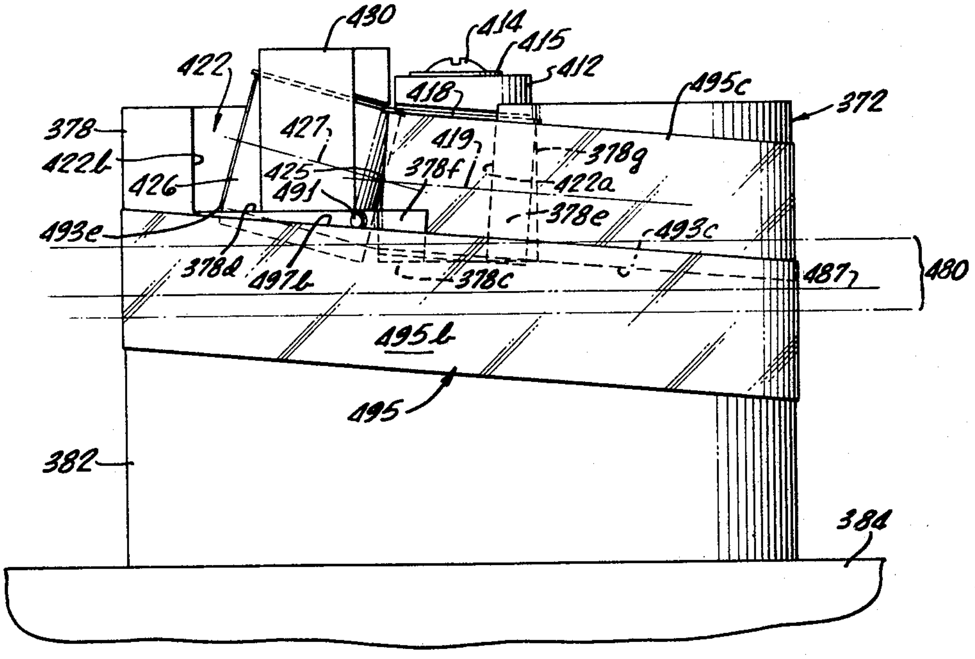
FIG. 23 is an exterior fragmentary elevation of the cylindrical drum assembly taken from the opposite side thereof.

The roller 418 is so oriented because the pitch of the tape spiral on the drum is oriented at an angle of approximately three degrees with respect to the horizontal and the axis 420 of the roller 418 is to be perpendicular to the centerline 495*f* of the tape. More specifically, the tape centerline 495*f* is in a medial plane 419 of the roller perpendicular to the axis 420. As shown in FIG. 23, the diameter of the roller 418 is approximately one-fifth the diameter of the drum 372; and the height of the roller between its end flanges is approximately equal to the width of the tape 495.

A twist guide roller 426 is mounted on an axis or a pin 428 carried on the arm of a mounting block 430 secured by suitable threaded fasteners 432 to the lower wall 378*b* of the upper drum member 378. This roller 426 is also cylindrical and the same size as the roller 418. As can be seen from FIGS. 20 and 23, the roller 426 is located on the opposite side of the interior of the upper drum member from the roller 418 and is spaced approximately 130 degrees around the periphery of the drum from the roller 418. An arcuate recess 391 is formed on the interior wall of the upper drum member 378 adjacent the roller 426 to provide adequate clearance for the roller and the tape extending around the roller.

With the roller 426 located as shown, the distance between the axes of the two rollers is greater than the radius of the drum 378. The axis 428 of the roller 426 is oriented in a vertical plane 429 that is parallel to the roller axis 420 and its vertical plane 421; however, the roller 426 is oriented at an angle, with respect to the vertical within its vertical plane 429 of approximately 16 degrees in the same direction as the axis 420 of roller 418. In other words, there is approximately 13 degrees difference between the angular orientation of the two rollers.

Figure 24:
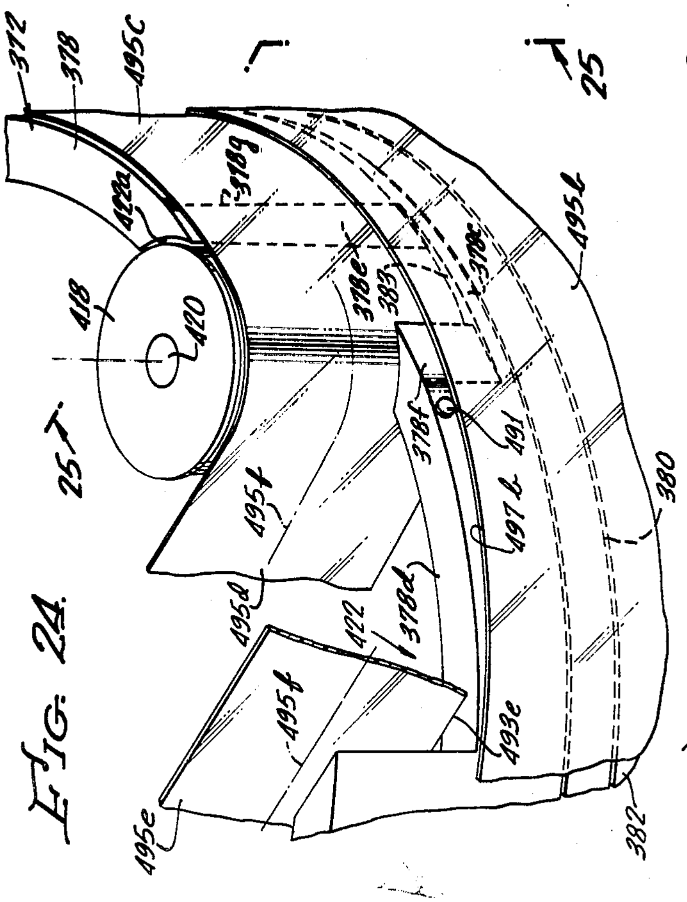
FIG. 24 is an enlarged fragmentary perspective view of the cylindrical drum assembly, illustrating the structure in the vicinity of the tape guide means in the upper drum member.

For a more detailed explanation of the side wall structure of the upper drum member 378 adjacent the opening 422, refer to FIGS. 23 and 24 where it can be seen that the width of the opening is approximately equal to the combined diameter of the two rollers 418 and 426. The opening 422 in the drum side wall includes a tape inlet portion 422*a* adjacent roller 418 and a tape outlet portion 422*b* which extends to the point where the tape 495 leaves the interior of the upper drum member. As seen, the tape inlet portion 422*a* is spaced slightly above the bottom edge of the drum member 378 leaving a ledge 378*c* in that area of the drum member so as to provide a continuous peripheral surface about the bottom of the drum member 378. The drum portion 378*d* defining the lower edge of the tape outlet portion 422*b* of opening 422 is spaced above the ledge 378*c* and the upper edge of the adjacent tape edge 497*b*.

The tape inlet opening 422*a* is actually located in a depressed area 383 in the peripheral surface of the upper drum member 378. The sides of the depressed area 383 are marked by a pair of recessed surfaces 378*e* and 378*f*. The width of the depressed area 383 is slightly greater than the width of the roller 418. The recessed surfaces 378*e* and 378*f* are actually curved, being formed on a radius somewhat larger than the drum radius. As seen from FIG. 25, the depth of the depressed area 383 is very slight. The start of the depressed area 383 is indicated by the dotted line 378*g* which is the line upon which the tape 495*c* normally departs the exterior of the upper drum member 378 prior to engaging the roller 418. Note also that the walls of the upper drum member 378 are curved adjacent the roller 418 to conform to the shape of the roller and permit the roller to be positioned in the substantially tangential relation mentioned above.

A guide button 491 for engaging and guiding the upper edge 497*b* of the tape is mounted on the upper drum member adjacent the recessed surface 378*f* and the drum edge 378*d*. A similar guide button 492 is located on the opposite side of the upper drum member 378 to guide the upper edge of the tape.

Figure 22:
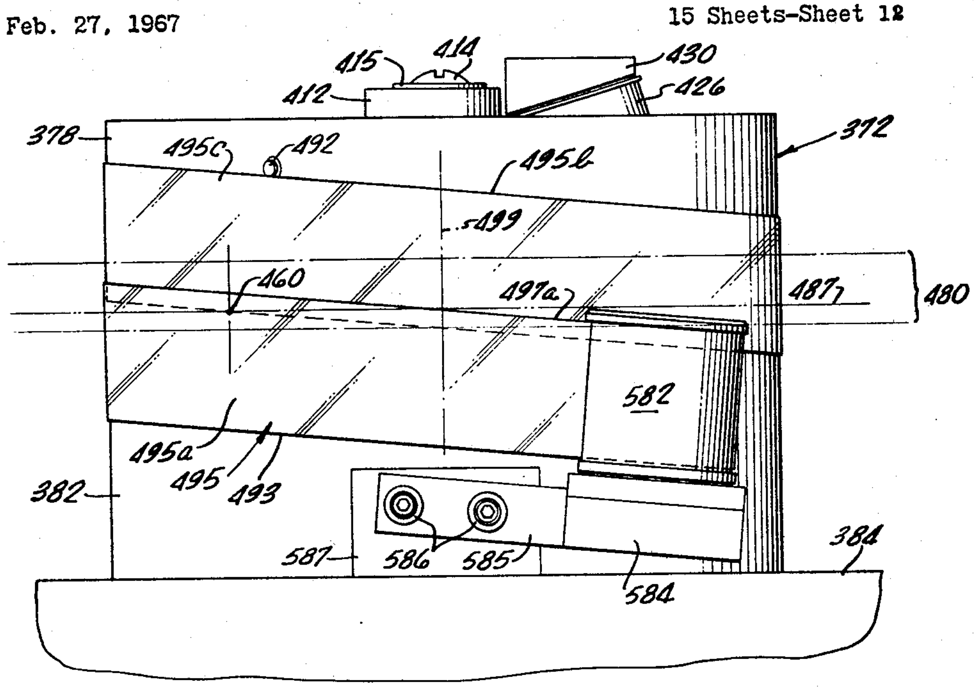
FIG. 22 is an exterior fragmentary elevation of the cylindrical drum assembly taken from one side thereof.

For guiding the tape from the exterior of the drum 372 onto the drum, there is provided the post 220 extending upwardly from the upper deck 24, and the roller 582. The post 220 directs the tape towards the entrance guide roller 582 mounted on its pin or axis 583 which in turn is mounted on a block 584. An arm 585 extending from the block 584 is secured by a suitable fastener 586 to a flat 587 formed on the lower side wall of the lower drum member 382. This is best seen in FIG. 22. The roller axis 583 is oriented at an angle of approximately three degrees with respect to the vertical. The roller 582 is located on the opposite side of the drum from the roller 418.

In leaving the interior of the drum 372 to a position exterior from the drum, the tape 495 is guided by the guide post 222 extending upwardly from the raised portion 230 of the upper deck 24.

Figures 27, 28:
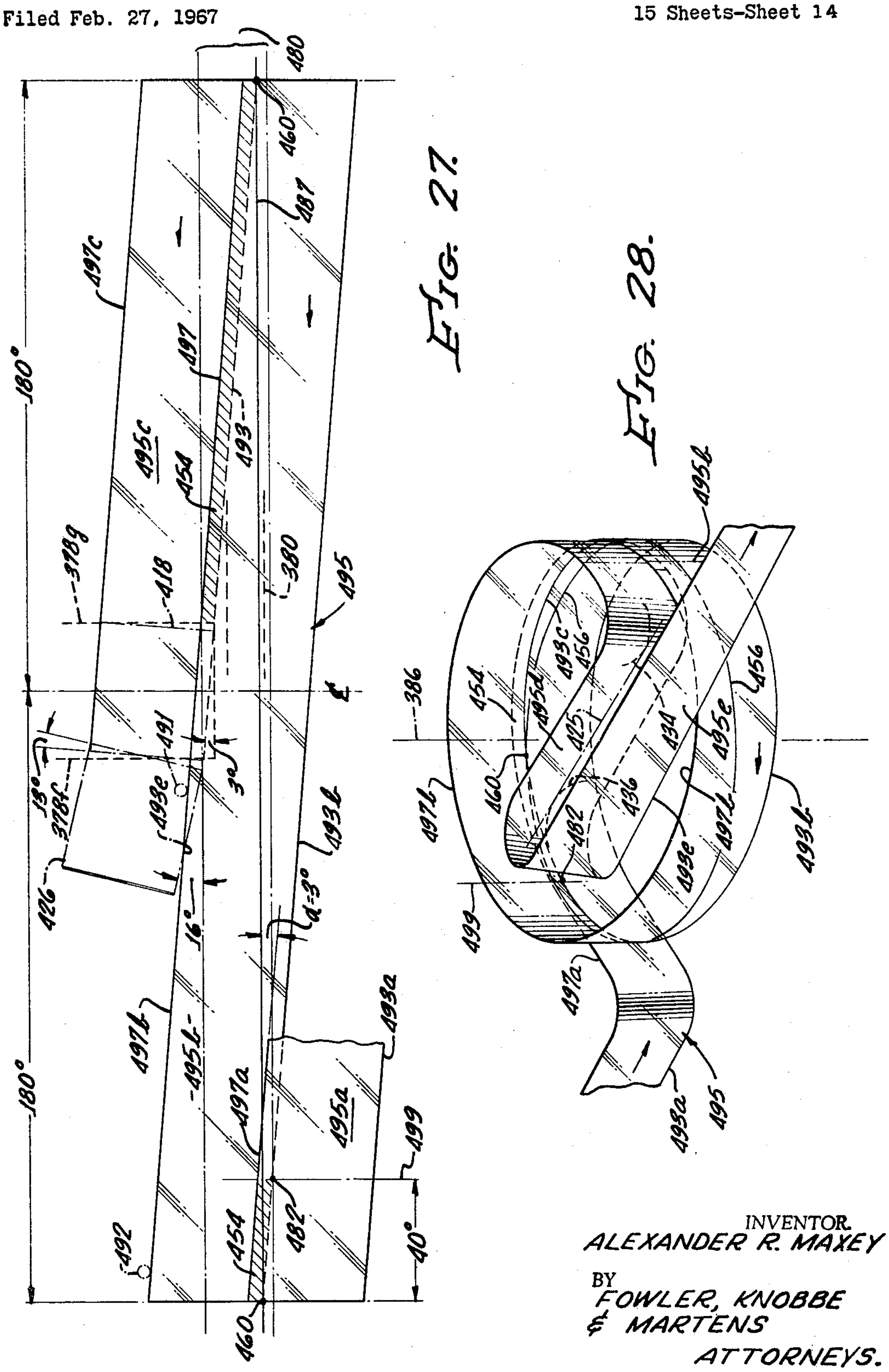
FIG. 27 is an approximate linear development schematically illustrating the tape spiral about the cylindrical drum assembly.
FIG. 28 is a schematic perspective view, illustrating the spiral of tape about the cylindrical drum.

For a description of the operation of the cylindrical drum embodiment of the invention, refer now primarily to the illustrations of FIGS. 27 and 28, although as well to FIGS. 20 through 25. The tape 495 is of course driven by a suitable drive means and wound around the drum 372. As the tape 495 leaves the guide post 220 extending towards the roller 582, it is twisted slightly around its centerline 495*f* so that the axis 583 of the roller is perpendicular to the centerline 495*f* as the tape extends around the guide roller 582. Since the guide roller 582 is oriented at an angle of approximately three degrees from the vertical, the tape 495*a* is directed towards the drum 372 at this angle with respect to the horizontal. The tape enters onto the lower end of the composite drum surface on the entrance tangent line 499 and in edge overlapping relationship with the tape 495*b* on the drum. The tape extends around the cylindrical drum surface in an upward spiral of a constant pitch of approximately three degrees for approximately one and one-half revolutions or 540 degrees. The tape 495*c* leaves the upper end of the drum from underlying relationship with the tape 485*b* on the drum approximately along the line 378*g* marking the beginning of the recessed surface 378*e* and the depressed area 383.

As can be seen, the adjacent edges 497*a*, 493*b* and 497*b*, 493*c*, of the tape spiral overlap one another with the entering tape on top. This overlapping tape comprises an area 454, shown in cross hatch, which is approximately in the shape of an elongated rectangle. One small end of the rectangle, which is about one-eighth of an inch, starts at the entrance tangent line 499 and its other small end is at the recess line 378*g*. The longer sides of the rectangular area 454 are of course formed by the upper and lower edges 493 and 497 of the tape 495. The tape overlapped area maintains this rectangular shape due to the fact that the drum surface is cylindrical and the tape spiral angle remains approximately three degrees throughout the spiral.

Thus, the overlapped area extends from a lower point 482 on the surface of the lower drum member 382 across the surface of the central drum member 380 and onto the surface of the upper drum member 78. This accounts for a closed collar 480 of tape which engages the lower periphery of the upper drum member and the upper periphery of the lower drum member. The upper and lower circular peripheries of the collar lie in the planes 481, 483 disposed above and below and parallel to the plane 487 described by the record-reproduce head 328 as it is rotated about the axis of the drum. As can be seen, the scan line 456 intersects the exposed edge **493*b* of the tape at the point 460 in the overlap area, which is about 40 degrees from the start of the overlap area. As in the earlier described embodiment of the invention, the collar 480 extends above and below the central drum 380. Due to the close spacing of the drum members a high impedance or resistance to airflow between the drum members is attained. As the central drum member rotates at 3600 revolutions per minute, air is drawn into the hollow drum member 378 through the opening 379 in the lower wall 378*b* of the upper drum member 378. Hence, the air is forced outwardly through the opening 330 adjacent the record-reproduce head 328. Since the tape collar 480 tends to seal the central drum member 380**, this low volume high pressure airflow creates a desired air bearing beneath the tape collar similar to that previously described. This naturally minimizes friction between the drum and the overlapping tape.

Since the central drum member 390 has a slightly smaller diameter than the upper and lower drum members 378 and 382 the tape tends to ride on this air bearing. It should also be noted from FIG. 25 that the ledge **378*c* provides the necessary supporting surface for the tape in the area of the recessed surfaces 378*e* and 378*f*. Thus, the existence of the ledge 378** ensures a snug fit of the tape across the center drum member, thus providing the necessary resistance to airflow produced by the rotation of the central drum member.

Figure 25:
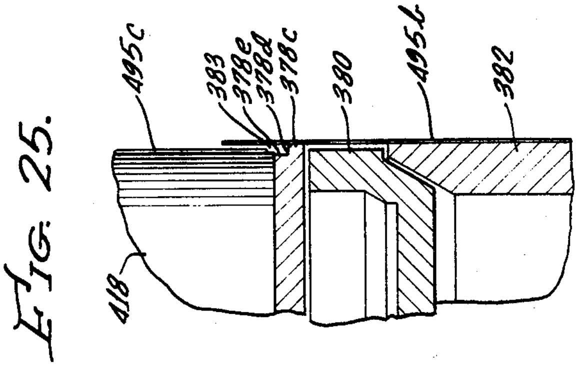
FIG. 25 is a fragmentary sectional elevation taken along line 25—25 of FIG. 24.

As the tape **493*c* reaches the depressed area 383, it extends into the inlet openings 422*a* towards the exit guide roller 418. As best seen in FIGS. 24 and 25, the recessed surface 378*e* permits a smooth departure of the tape 495*c* from the underlying relation beneath the edge 497*b* of the preceding tape convolution 495*b*. The tape 495*c* is normally slightly spaced from the surface 378*e*; however, during rapid starting and stopping operation of the tape, surface 378*e* does serve a supporting function. When the tape is rewound by being driven in the reverse direction, the recessed surface 378*e* permits the upper tape convolution 495*c* to be smoothly positioned beneath the edge portion of the lower tape convolution 495*b*. It should be noted that the recessed surface 378*f* on the opposite side of the tape inlet portion 422*a* of the opening 422 permits the continuing tape section 495*b*, particularly its upper edge 497*b*, to continue smoothly to be supported by the surface of the upper drum member 378 beneath the edge 378*d***.

One of the characteristics of rollers is that a tape wound thereon must conform to the surface of the roller with the centerline of the tape perpendicular to the axis of the roller. Hence, as explained, the exit roller 418 is arranged in this manner with respect to the tape so that the tape centerline **495*f* is perpendicular to the roller axis 420, and the medial plane 419 of the roller 418 includes the centerline 495*f*. The tape is wrapped around a portion of the roller 418 and is directed toward the twist roller 426 on a line which passes close to the central hub 378*a* of the drum member 378**.

Note that the angle of the tape **495*d* extending between the rollers 418 and 426 with respect to the horizontal is determined by the degree of contact with the roller 418. In this instance, since the tape is in contact with the roller about 90 degrees, the centerline of the tape portion 495*d* is roughly parallel to the horizontal. However, the tape surface leaving the roller is angled approximately three degrees with respect to the vertical. In essence, the horizontal angle of the tape spiral on the drum has been changed to a three degree vertical tilt of the tape surface. The centerline of the tape departing the roller 418 remains in the medial plane 419 perpendicular to the axis 420 until the tape contacts the roller 426**.

Since the twist guide roller 426 is mounted at an angle of 16 degrees with respect to the vertical but with its axis 428 in a vertical plane 429 parallel to the axis of the roller 418, the tape section **495*d* is twisted as it passes between the two rollers. This twisting is necessary to cause the tape to conform to the surface of the twist roller 426** and it is necessary that the twisting action be about the centerline of the tape. The amount of twist is equal to the increase in the angular relationship with respect to the vertical of the roller axes, or in this case, approximately 13 degrees.

With the tape twisted in this manner, the centerline **495*f* of the tape 495*d* extending around the roller 426 is in a medial plane 427 extending through the center of the roller 426 and perpendicular to the roller axis 428. The medial planes 419 and 427, FIG. 23, intersect on a line 425, FIG. 28, which is coincident with the tape centerline. This line defines a common tangent with the circular medial sections 434 and 436, partially indicated in dotted lines, through the rollers 420 and 428 lying respectively in the medial planes 419 and 427. This relationship ensures proper alignment of the tape 495 on the rollers 418 and 426**.

It is desirable to minimize the amount of twisting of the tape for a given length so that the tape is not unduly stressed. In the arrangement of the invention illustrated, the axis of the rollers are spaced approximately four inches apart; hence, the tape portion **495*d* is twisted slightly more than three degrees per inch of the tape between the two rollers. The tape is wrapped or wound onto the twist roller 426** so as to engage approximately 180 degrees of the surface of the roller.

As best seen in FIG. 27, the lower side of roller 426 is about on the same elevation as roller 418. However, due to the orientation of the roller 426, the side of the roller from which the tape leaves the roller is higher than the side of the roller from which the tape enters. This elevation is sufficient to raise the lower edge **493*e* of the tape portion 495*e* above the lowest portion of the upper edge 497*b* of the tape spiral, as seen in FIG. 24. The tape is raised an amount about equal to the difference in elevation between edge 378*c* of the tape inlet portion 422*a* and edge 378*d* of the tape outlet portion 422*b*. That is, the tape edge 493*e* is above the edge 378*d*. Thus the tape is uniquely removed from beneath the overlapping edge 497*b* of the preceding tape convolution 495*b***.

Since the tape surface leaving the twist roller 426 is at the same angle as the axis of the exit roller, or approximately 16 degrees with respect to the vertical plane, it is desirable to once more twist the tape before it is wound onto the take-up reel having a vertical axis. This is accomplished by twisting section **495*e* of the tape extending between the roller 426 and the vertically oriented guide post 222, as seen in FIGS. 20 and 21. In the arrangement illustrated, this post is approximately four and three-fourths inches from the axis of the twist roller 426. During that distance, it is necessary to untwist the tape at approximately 16 degrees or about four degrees per inch. It should be noted however that this untwisting is not used to change the angle of the tape centerline 495*f* with respect to the horizontal, in that the tape is essentially horizontal as it leaves the twist roller 426. Note that the tape has very slight contact with the post 222** and thus only negligible friction is introduced.

Figure 26:
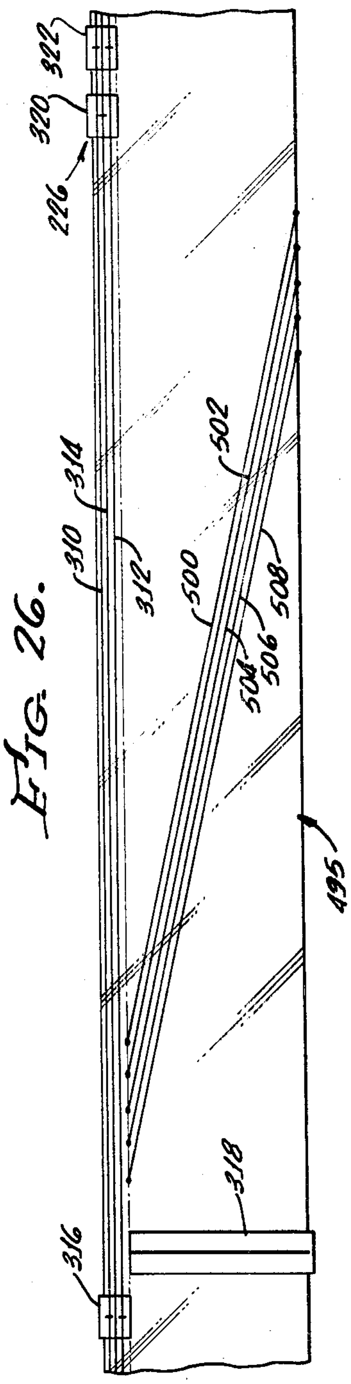
FIG. 26 is a schematic elevation of a fragment of tape, illustrating the longitudinal control and audio tracks and the successive track portions extending obliquely of the tape containing the video signal information, all as recorded on the video tape recorder utilizing the cylindrical drum assembly.

The use of a cylindrical drum permitted by the unique internal roller arrangement described, provides several advantages, one of these being improved tape utilization. The rotation of the record-reproduce head 328 caused by the motor 408 as the tape is being driven around the cylindrical drum 372, produces the successive paths 500, 502, 504, 506 and 508 on the tape surface as illustrated in FIG. 26. These paths must at all points be spaced a sufficient amount to provide faithful signal reproduction; however, it will be appreciated that it is not necessary for the paths to be spaced more than a certain minimum amount. Hence, it is desirable that the paths be equally spaced throughout their entire length as indicated in the drawing to obtain maximum tape utilization.

The internal roller arrangement described also provides simplified rewinding operation in that the entire tape is within the interior of the drum before being fed beneath the preceding convolution on the tape. Another benefit provided is that due to the constant angle of the tape spiral on the cylindrical drum surface, the forces on the tape are essentially linear; and hence lateral force components are minimized. Because of changes in humidity of the operating environment and variations in the strength of the tape, it is of course very desirable that lateral force components be so minimized. The internal roller and cylindrical drum approach for solving the tape overlap problem, also provides the various features previously described relating to the air bearing, the edge support aspect of the overlap tape arrangement and the availability of the guard band on the tape for audio signals.

EMBODIMENT OF FIGS. 29 AND 30

Figure 29:
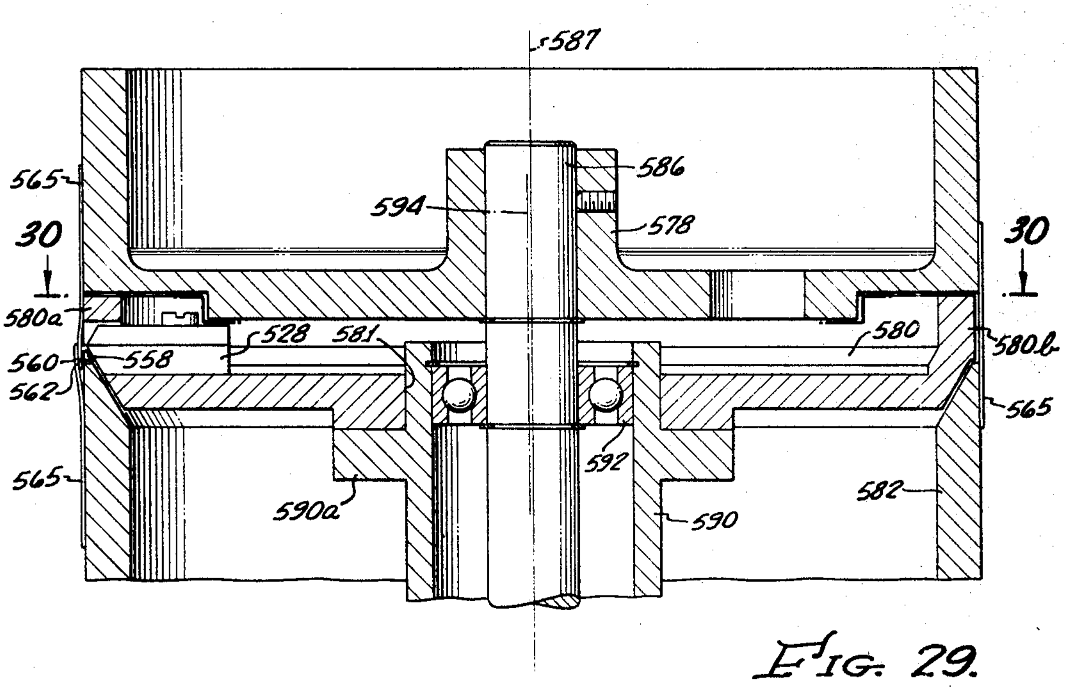
FIG. 29 is a cross-sectional view of a drum assembly similar to the one shown in FIG. 19, except that the center drum is slightly fixed eccentric in accordance with another embodiment of this invention.
Figure 30:
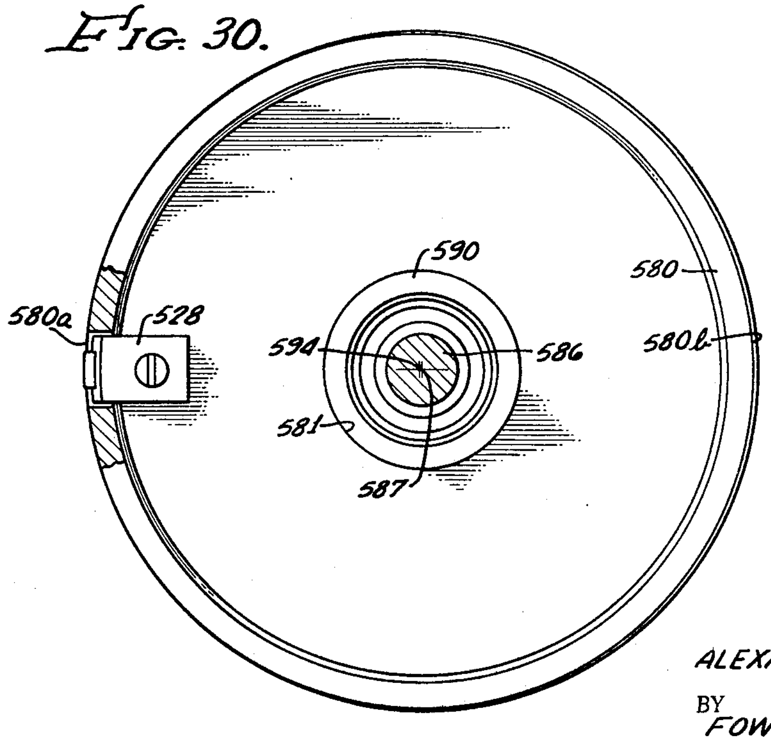
FIG. 30 is a view on line 30—30 of FIG. 29.

In FIGS. 29 and 30 there is shown a three member tape receiving drum 572, generally similar to the drum of FIG. 19. However, the diameter of a rotatable central drum member 580 is microscopically smaller than the diameter of the adjacent peripheries of fixed upper and lower members 578 and 582. The upper fixed member 578, a bearing 592, and a rotatable sleeve 590 are concentrically mounted on a fixed shaft 586. The central drum member 580 surrounding sleeve 590 and supported on flange **590*a* is formed with its inner bore 581 eccentrically located with respect to its circular periphery or exterior surface. Consequently, the centerline 594 of the exterior surface of the central drum member 580 is offset from the rotational axis 587 of the fixed shaft 586, making the member 580 eccentrically mounted with respect to the axis 587**.

The diameter difference between the central drum member and the adjacent drum portions is very slight, being only about 7 mils or .007 of an inch. Since this is essentially unnoticeable, it has been greatly exaggerated in the drawings. The amount of eccentricity is 3½ mils with the result that one side **580*a* of the central member 580 is completely flush with the adjacent peripheral surfaces of the upper and lower drum members while the other side 580*b* is thus recessed 7 mils from the adjacent surfaces. The recess of the intermediate peripheral surfaces of member 580 gradually decreases from 7 mils at the side 580*b* to nothing at the flush side 580*a***.

A record-reproduce head 528 is carried by the central member 580 at the side **580*a* which is completely flush with the adjacent surfaces. As previously mentioned, in FIGS. 29 and 31, the pole pieces 558 extend outwardly slightly beyond the periphery of the drum surface creating a protuberance or miniature tent 560 in the tape spiral 565 with a slight space 562** beneath the tent. It has been found that during rotation of the central drum member, the eccentric mounting arrangement provides an improved air lubrication for the tape, especially under extremes of environmental conditions, such as high humidity. The tent effect also contributes significantly to the air lubrication.

I claim:

1. In apparatus for recording and/or reproducing signals on a tape along successive paths which extend diagonally with respect to the tape, (a) a drum having an axis and having a composite surface which extends about said axis for supporting the tape; the drum including upper, central and lower drum members disposed adjacent one another along the drum axis and each having a peripheral surface which provides a substantial tape supporting portion of said composite surface for supporting the tape;

(b) means including a transducer mounted adjacent the periphery of the central drum member for recording and/or reproducing signals on the tape;

(c) means for rotating the central drum member about the drum axis while maintaining the upper and lower drum members stationary, so that the transducer describes a circular path;

(d) means for guiding tape onto the drum, around the composite surface of the drum in a spiral for more than 360° and away from the drum, with adjacent edge portions of the tape in the spiral overlapping along an area which extends across the periphery of the central drum member and intersects the circular path described by the transducer to cause said tape spiral to form a collar of tape extending around said central drum member;

(e) means defining a path for communicating air from the exterior of said drum to the interior of said central drum member; and (f) means defining a path for communicating air from the interior of said central drum member to the underside of said collar of tape;

whereby the rotation of the central drum member produces air flow through said air communicating means to the underside of said spiral of tape.

2. The apparatus of claim 1 wherein the tape guide means includes at least one tape guide button protruding from the peripheral surface of the upper drum member for engaging the upper edge of the tape, and at least one tape guide button protruding from the peripheral surface of the lower drum member for engaging the lower edge of the tape.

3. The apparatus of claim 1 wherein the transducer is a magnetic record-reproduce head which engages the inner side of the tape spiral; and the center drum member is rotated about the drum axis in the direction which causes the transducer in describing its circle to move off of, rather than on to, the exposed tape edge in the area of overlap.

4. The apparatus of claim 1 wherein the central drum member has a height which is about one-third the width of the tape.

5. The apparatus of claim 1 in which said transducer extends slightly beyond the periphery of said central drum member to engage the inner side of said tape, thereby causing an outwardly extending miniature tent in the tape surface, said means defining a path for communicating air from the interior of said central drum member including an opening in the periphery of said central drum member located adjacent said transducer in communication with the tent.

6. The apparatus of claim 1, wherein the spacing between the peripheral edges of the central and the stationary drum members is sufficiently close to form a high impedance or restriction to the passage of air between them.

7. The apparatus of claim 6 wherein the tape overlap area extends from the lower drum member, across the central drum member and onto the upper drum member, so that the tape spiral forms a closed collar of tape extending between and onto both stationary drum members.

8. The apparatus of claim 6 wherein the periphery of the central drum member is slightly recessed with respect to the adjacent peripheries of the upper and lower drum members, thus forming a slight depression in the composite surface of the drum.

9. In apparatus for recording and/or reproducing signals on a tape along successive paths which extend diagonally with respect to the tape, (a) a drum having an axis and having a frustoconical composite surface which extends about said axis for supporting the tape, said drum including upper, central and lower drum members disposed adjacent one another along the drum axis and each having a peripheral surface which provides a substantial tape supporting portion of said composite surface for supporting the tape;

(b) means including a transducer mounted adjacent the periphery of the central drum member for recording and/or reproducing signals on the tape;

(c) means for rotating the central drum member about the drum axis while maintaining the upper and lower drum members stationary so that the transducer describes a circular path;

(d) means for guiding tape onto the drum around the composite surface of the drum in a spiral of increasing pitch for more than 360°, and away from the drum, with adjacent portions of the tape in the spiral overlapping along an area which extends across the periphery of the central drum member and intersects the circular path described by the transducer to cause said tape spiral to form a collar of tape extending around said central drum member;

(e) means defining a path for communicating air from the exterior of said drum to the interior of said central drum member;

(f) means defining a path for communicating air from the interior of said central drum member to the underside of said collar of tape; and (g) a recessed area on the drum member which defines the larger end of said frustoconical surface, the adjacent edges of the tape in the spiral crossing one another in said recessed area to define one extremity of the tape overlap area extending about the drum.

10. The apparatus of claim 9 wherein the recessed area on the drum member is spaced away from the edge of said drum member adjacent the central drum member so as to leave a ledge of continous peripheral surface at said edge.

11. The apparatus of claim 9 wherein the cone angle of said drum is less than 2°.

12. The apparatus of claim 9 further comprising means for driving the tape in the record-reproduce direction and alternatively in the reverse or rewind direction; and, wherein the tape guide means cooperates to guide the tape to enter onto the small end of the composite frustoconical drum surface and exit from the large end when the tape is driven in the record-reproduce direction.

13. The apparatus of claim 12 wherein said tape guiding means and said drum are constructed such that the tape spiral has an angle of approximately 3° with respect to said circular path as the tape starts onto said drum at an angle of approximately 6° with respect to said circular path as the tape leaves said drum when the tape is driven in the record-reproduce direction.

14. In apparatus for recording and/or reproducing signals on a tape along successive paths which extend diagonally with respect to the tape, (a) a drum having an axis and having a substantally cylindrical composite surface which extends about said axis for supporting the tape; and (b) means for guiding tape onto the drum, around the composite surface of the drum in a spiral for more than 360°, and away from the drum, with adjacent edge portions of the tape in the spiral overlapping;

(c) said drum including upper and lower drum members, each having a peripheral surface which provides a portion of said composite surface, said upper drum member being stationary, substantially hollow, and having an opening disposed directly in the path of the tape at the upper end of the spiral for passing tape between the peripheral surface and the interior of the upper drum member;

(d) said means for guiding tape including (1) means for guiding tape between a position exterior of the drum and the peripheral surface of the lower drum member in edge overlying relationship with tape on the drum, (2) first cylindrical means within said upper drum member for guiding tape between the interior and the peripheral surface of the upper drum member in edge underlying relationship with tape on the drum, and (3) second cylindrical means within said upper drum member for guiding tape between the interior of the upper drum member and a position exterior of the drum, said first and second cylindrical means having axes inclined relative to one another so as to twist tape extending between them about its center line sufficiently to elevate the lower edge of the tape as the tape extends around said second cylindrical means to above the lowest point on the upper edge of the tape spiral, thereby enabling tape to extend away from the drum.

15. The apparatus of claim 14 wherein the peripheral surface of the upper drum member has a depressed area formed therein at said opening, said depressed area being spaced upwardly from the lower peripheral edge of the upper drum member so as to leave a ledge of cylindrical peripheral surface at said edge.

16. The apparatus of claim 14, wherein said means for guiding the tape between the exterior of the drum and the peripheral surface of the drum is on the opposite side of said drum from the means for guiding the tape between the peripheral surface of said drum and the drum interior.

17. The apparatus of claim 14, wherein the means for guiding tape between the interior and the peripheral surface of the upper drum member includes a first tape guide cylindrical roller mounted in the upper drum member adjacent said opening with the roller being in approximately tangential relation with the surface of said drum but with the axis of the roller being oriented off vertical by an angle equal to the pitch of the tape spiral and aligned so that the centerline of the tape on the roller is in a medial plane through said roller perpendicular to the roller axis; and the means for guiding tape between the interior of the upper drum member and a position exterior of the drum includes a second tape guide roller mounted in the upper drum member at approximately the same elevation as the first guide roller, the axis of the second guide roller being disposed such that a medial plane through said second roller and perpendicular to the axis of the second roller intersects the medial plane of said first roller on a line which defines a common tangent to a medial circular section about each of said rollers in its respective medial plane whereby the centerline of tape passing around said second roller lies in the medial plane of the second roller, the axis of said second roller being oriented off vertical in the same direction as the axis of said first roller but at a greater angle so as to twist tape extending between the guide rollers sufficiently to elevate the lower edge of the tape as the tape extends around the second guide roller to substantially above the lowest point on the upper edge of the tape spiral whereby tape may extend away from the drum.

18. The apparatus of claim 14, wherein the means for guiding tape between the interior and the peripheral surface of the upper drum member includes a first tape guide cylindrical roller mounted in the upper drum member adjacent said opening with the roller being in approximately trangential relation with the surface of said drum but with the axis of the roller being oriented off vertical by an angle equal to the pitch of the tape spiral so that the roller axis is perpendicular to the centerline of the tape on the drum; and the means for guiding tape between the interior of the upper drum member and a position exterior of the drum includes a second tape guide roller mounted in the upper drum member at approximately the same elevation as the first guide roller, the axis of the second guide roller being disposed in a vertical plane with the plane being parallel to the axis of the first guide roller, and the axis of the second roller being oriented off vertical in the same direction as the axis of the first guide roller but at a greater angle so as to twist tape extending between the guide rollers about the tape's centerline sufficiently to elevate the lower edge of the tape as the tape extends around the second guide roller to substantially above the lowest point on the upper edge of the tape spiral whereby tape may extend away from the drum.

19. The apparatus of claim 18, wherein the width of said opening is approximately equal to the combined diameters of said rollers.

20. The apparatus of claim 18, wherein the axis of said first roller is spaced from the axis of said second roller an amount greater than the radius of said drum.

21. The apparatus of claim 18, wherein the second roller is located adjacent the inner wall of said upper drum member more than 90 degrees around the drum from said first roller.

22. The apparatus of claim 18, wherein said tape guiding means are located such that the tape entering and departing the interior of the drum engages approximately 90 degrees of the surface of said first roller and approximately 180 degrees of the surface of said second roller.

23. The apparatus of claim 18, wherein said first tape guide roller is oriented off vertical by approximately three degrees and said second guide roller is oriented off vertical by approximately 16 degrees.

24. The apparatus of claim 18, wherein said opening includes a tape inlet portion adjacent said first roller through which the tape enters the interior of the drum to engage said first roller, the lower edge of said tape inlet portion being spaced slightly from the lower edge of said upper drum member so as to leave a ledge of continuous peripheral surface at the lower edge of said upper drum member.

25. The apparatus of claim 24, wherein said opening includes a tape outlet portion through which the tape leaves the interior of the drum, the lower edge of said tape outlet portion being spaced above the lower edge of said tape inlet portion approximately the amount the tape is elevated by said rollers.

26. In apparatus for recording and/or reproducing signals on a tape along successive paths which extend diagonally with respect to the tape, (a) a drum having an axis and having a composite surface which extends about said axis for supporting the tape, the drum including upper, central and lower drum members disposed adjacent one another along the drum axis and each having a peripheral surface which provides a substantial tape supporting portion of said composite surface for supporting the tape;

(b) means including a transducer mounted adjacent the periphery of the central drum member for recording and/or reproducing signals on the tape;

(c) means for rotating the central drum member about the drum axis while maintaining the upper and lower drum members stationary so that the transducer describes a circular path; and (d) means for guiding tape onto the drum around the composite surface of the drum in a spiral of more than 360° and away from the drum, with adjacent edge portions of the tape in the spiral overlapping along an area which extends across the periphery of the central drum member and intersects the circular path described by the transducer;

(e) the central drum member being slightly smaller than the diameter of the adjacent stationary drum surfaces and being eccentrically mounted with respect to the axis of said stationary drum members so that the periphery on one side of said central drum member is essentially flush with the periphery of the adjacent stationary drum members while the periphery on the diametrically opposite side of said central drum member is slightly recessed.

27. The apparatus of claim 26 wherein said other side of said central drum member is recessed approximately .007 inch from the surfaces of the adjacent stationary drum members.

28. The apparatus of claim 26 wherein said transducer is mounted on the flush side of said central drum member.

References Cited

UNITED STATES PATENTS

| | | | |
|---|---|---|---|
| 2,998,495 | 8/1961 | Maxey | 179—100.2 |
| 3,159,501 | 11/1964 | Maxey | 179—100.2 |
| 3,378,646 | 4/1968 | Shashoua et al. | 179—100.2 |
| 3,293,377 | 12/1966 | Backers et al. | 179—100.2 |
| 3,333,753 | 8/1967 | Streets | 179—100.2 |
| 3,404,241 | 10/1968 | Streets et al. | 179—100.2 |

FOREIGN PATENTS

| | | |
|---|---|---|
| 1,265,219 | 5/1960 | France. |
| 1,275,676 | 11/1960 | France. |
| 915,671 | 1/1963 | Great Britain. |
| 16,271 | 8/1963 | Japan. |

BERNARD KONICK, Primary Examiner

R. S. TUPPER, Assistant Examiner

U.S. Cl. X.R.

178—6.6